(12) United States Patent
Farag et al.

(10) Patent No.: US 11,889,307 B2
(45) Date of Patent: Jan. 30, 2024

(54) END-TO-END SECURITY FOR ROAMING 5G-NR COMMUNICATIONS

(71) Applicant: T-Mobile USA, Inc., Bellevue, WA (US)

(72) Inventors: Paul Farag, Renton, WA (US); Raymond Ball, Seattle, WA (US); Andrew Watts, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 123 days.

(21) Appl. No.: 16/292,202

(22) Filed: Mar. 4, 2019

(65) Prior Publication Data

US 2020/0059786 A1 Feb. 20, 2020

Related U.S. Application Data

(60) Provisional application No. 62/765,303, filed on Aug. 20, 2018.

(51) Int. Cl.
*H04W 12/069* (2021.01)
*H04L 9/08* (2006.01)
(Continued)

(52) U.S. Cl.
CPC ......... *H04W 12/069* (2021.01); *H04L 9/0825* (2013.01); *H04L 9/3236* (2013.01);
(Continued)

(58) Field of Classification Search
None
See application file for complete search history.

(56) References Cited

U.S. PATENT DOCUMENTS

| 2014/0040984 A1 | 2/2014 | Mackler | |
| 2014/0095865 A1* | 4/2014 | Yerra | H04L 9/3271 |
| | | | 713/156 |

(Continued)

FOREIGN PATENT DOCUMENTS

| KR | 20150097627 A | 8/2015 |
| WO | 2018019838 A1 | 2/2018 |
| WO | 2018046109 A1 | 3/2018 |

OTHER PUBLICATIONS

Zugenmaier, A., et al., May 2001. Enhancing applications with approved location stamps. In IEEE Intelligent Network 2001 Workshop. IN 2001 Conference Record (Cat. No. 01TH8566) (pp. 140-147). IEEE. (Year: 2001).*

(Continued)

*Primary Examiner* — Luu T Pham
*Assistant Examiner* — Edward X Long

(57) ABSTRACT

The present disclosure describes techniques that facilitate the encryption of data communications between a home and VPLMN, along with the verification of a content and origin of encrypted messages at each end of a data communication. In one non-limiting example, the process of verifying the content and origin of an encrypted message is facilitated partly by an exchange of network public keys between the HPLMN and VPLMNs. In another example, a network certificate aggregator (NCA) may act as a certificate authority (CA) by verifying the identities of interacting home and VPLMNs. The NCA may facilitate and exchange public keys between a home and VPLMN, whereby the HPLMN and VPLMNs need only trust and verify an identity of the NCA. Alternatively, the NCA may act as a conduit for data communications between the HPLMN and VPLMN.

20 Claims, 12 Drawing Sheets

(51) Int. Cl.
  *H04L 9/32* (2006.01)
  *H04W 12/033* (2021.01)
  *H04W 12/0431* (2021.01)
  *H04W 84/04* (2009.01)

(52) U.S. Cl.
  CPC ......... *H04L 9/3247* (2013.01); *H04W 12/033* (2021.01); *H04W 12/0431* (2021.01); *H04W 84/042* (2013.01)

(56) References Cited

U.S. PATENT DOCUMENTS

| | | | |
|---|---|---|---|
| 2014/0269515 | A1 | 9/2014 | Zhao et al. |
| 2017/0164189 | A1* | 6/2017 | Zhong .................. H04L 63/0435 |
| 2019/0014088 | A1* | 1/2019 | Subramaniyan .... H04L 63/0281 |
| 2019/0147150 | A1* | 5/2019 | Bansal .................... H04L 9/321 713/170 |
| 2019/0289462 | A1* | 9/2019 | Kim .................. H04W 12/0433 |
| 2020/0186995 | A1* | 6/2020 | Nakarmi ............... H04W 12/06 |

OTHER PUBLICATIONS

Kim, J., et al., 2017. 3GPP SA2 architecture and functions for 5G mobile communication system. ICT express, 3(1), pp. 1-8. (Year: 2017).*
China Mobile. '23:502: removing the editor's note in 4.3.2.2.2 on S-NSSAI of slice roaming in PDU session establishment'. S2-180712. SA WG2 Meeting #125. Jan. 22-26, 2018 See pp. 2-4; and figure 4.3.2.2.2-1.
International Patent No. PCT/US2019/047337, International Search Report and Written Opinion dated Dec. 6, 2019, 11 pages.
Deutsche Telekom AG: "Incorporating Contents of the SBA Living Document into the TR", 3GPP Draft; S3-181715 Incorporating Living Doc Into TR, 3rd Generation Partnership Project (3GPP), Mobile Competence Centre; 650, Route Des Lucioles; F-06921 Sophia-Antipolis Cedex; France vol. SA WG3, No. La Jolla, CA (USA); May 21, 2018-May 25, 2018 May 18, 2018 (May 18, 2018), XP051456989, Retrieved from the Internet: URL:http://www.3gpp.org/ftp/Meetings%5F3GP P%5FSYNC/SA3/Docs [retrieved on May 18, 2018] *.
European Patent Application No. 19850946.5, Search Report dated Jan. 25, 2022, 11 pages.

* cited by examiner

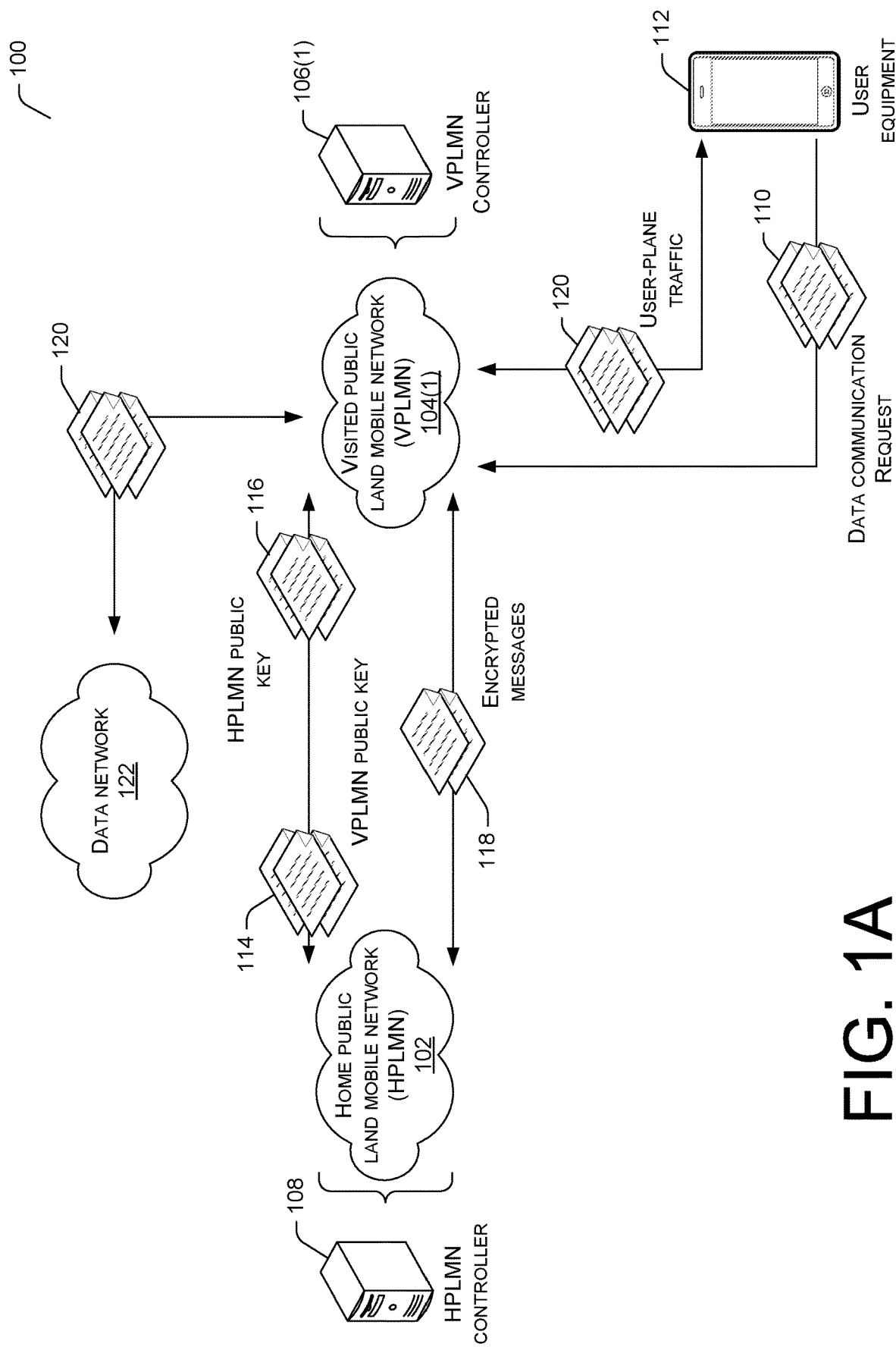

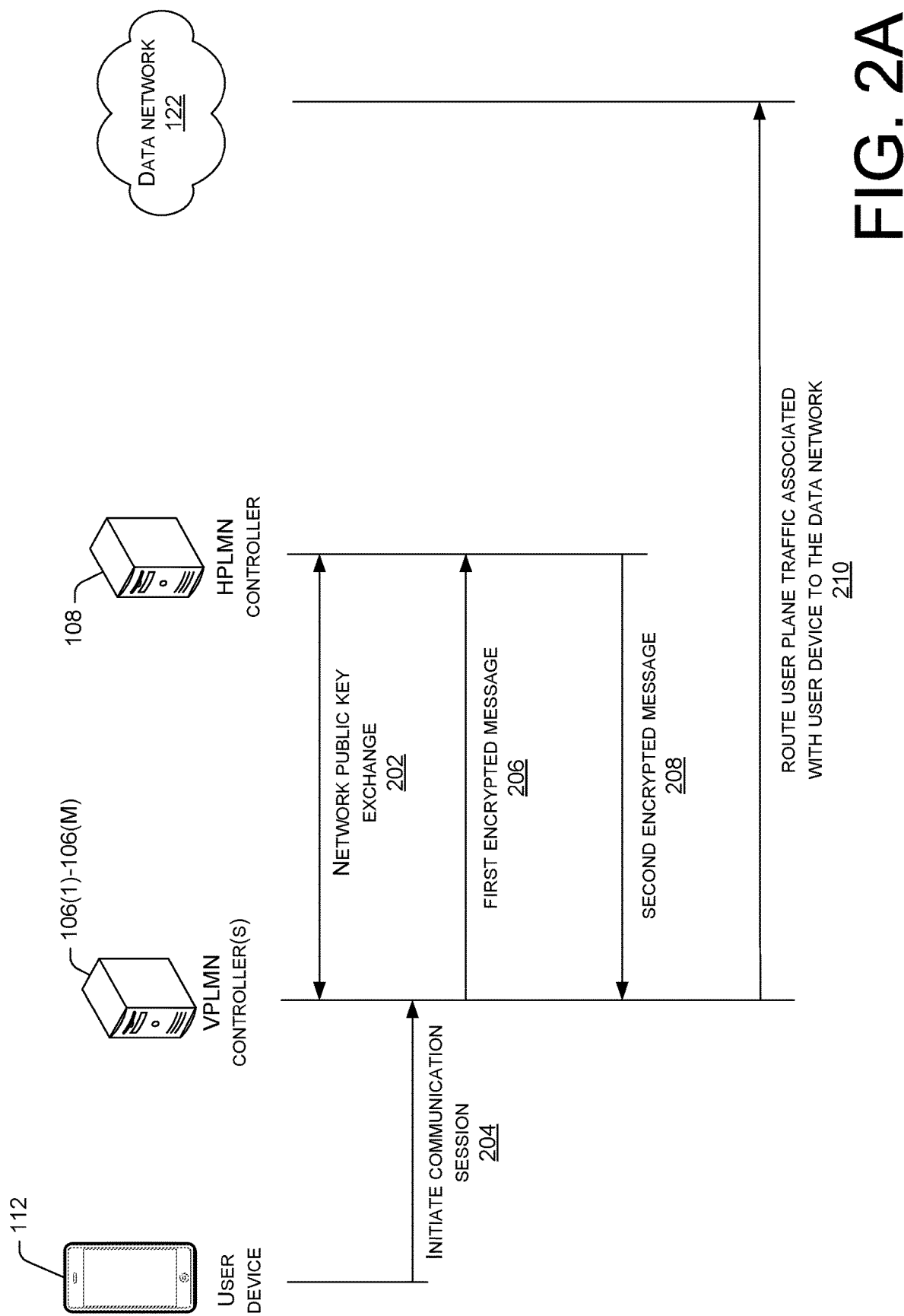

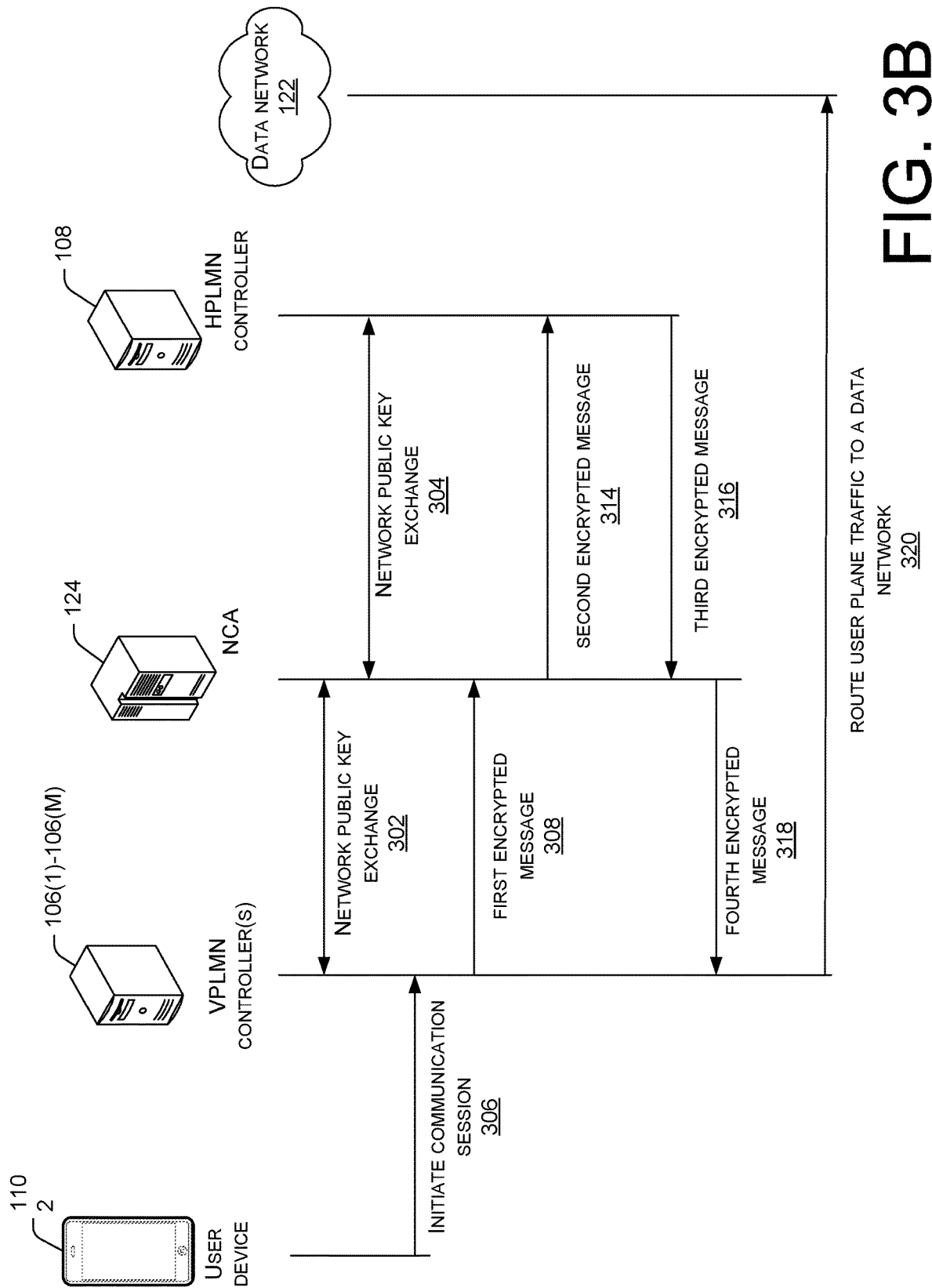

END-TO-END SECURITY FOR ROAMING 5G-NR COMMUNICATIONS

CROSS-REFERENCE TO RELATED PATENT APPLICATION

This application claims priority to a co-pending, commonly owned U.S. Provisional Patent Application No. 62/765,303, filed on Aug. 20, 2018, and titled "End-to-End Security of Roaming Communications over 5G Networks," which is herein incorporated by reference in its entirety.

BACKGROUND

Historically, a Signaling System No. 7 (SS7) protocol is used to exchange control information associated with the setup and release of voice, text, and data communications over a telecommunication network. The SS7 protocol is an international telecommunication standard that defines how elements in a public switch telephone network (PSTN) exchange information. The SS7 protocol enables voice, text, and data communications between fixed line networks (i.e. landlines) and mobile telecommunication networks, thus permitting mobile devices on one network to roam on another network, such as when travelling in a foreign country.

Recently, however, security experts have identified security vulnerabilities with the SS7 protocol that may be exploited to enable data theft, eavesdropping, text interception, and unauthorized location tracking. These security vulnerabilities essentially represent a man-in-the-middle attack between each end of the voice, text, and data communication.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1A and 1B illustrate a computing environment for generating end-to-end security for data communications between a HPLMN and a VPLMN.

FIGS. 2A and 2B illustrate block diagrams of processes for routing user-plane traffic to a data network via one of a VPLMN controller or a HPLMN controller while a user device is roaming in a VPLMN.

FIGS. 3A, 3B, and 3C illustrate block diagrams of processes for a network certificate aggregator (NCA) to facilitate routing user-plane traffic associated with a user device roaming in a VPLMN.

DETAILED DESCRIPTION

Figure 1B:
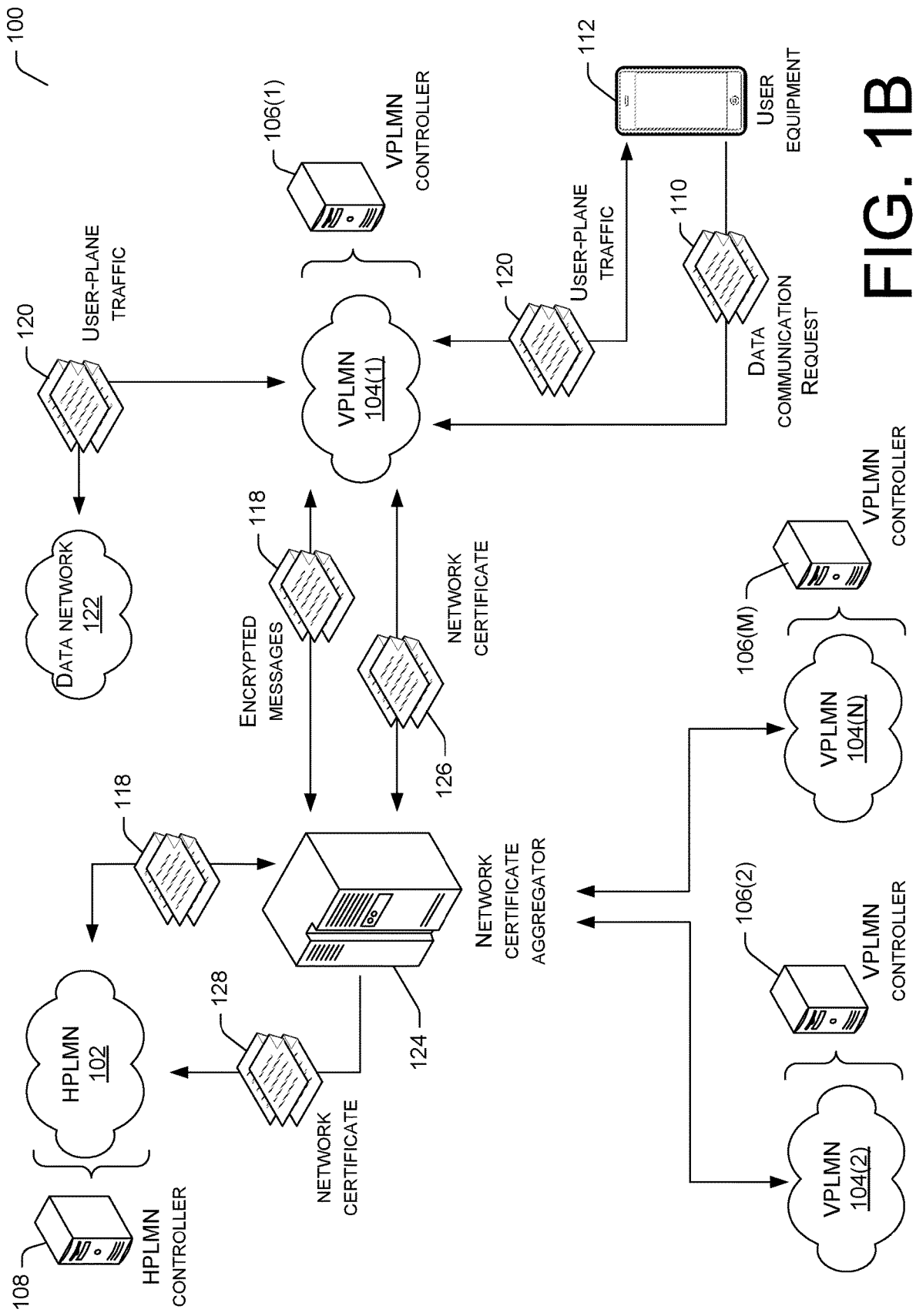

This disclosure describes techniques that facilitate establishing end-to-end security for roaming communications between 5G-New Radio (5G-NR) telecommunication networks. More specifically, a system is described whereby data communications initiated at a Visited Public Land Mobile Network (VPLMN) can be encrypted prior to being transported to the Home Public Land Mobile Network (HPLMN) of a user device. In this way, data communications can be protected from security vulnerabilities that are inherent in the SS7 protocol during transport between the initiating and receiving networks (e.g. HPLMN and VPLMN, or vice versa).

To facilitate the end-to-end encryption of data communications and related messaging between a HPLMN and VPLMN, the HPLMN and VPLMN may exchange public keys of asymmetric key pairs with one another, such that each telecommunication network (i.e. HPLMN and VPLMN) may decrypt encrypted messages sent by their counterpart. For example, the VPLMN may receive from the HPLMN, a public key associated with the HPLMN that the VPLMN can use to decrypt encrypted messages sent by the HPLMN. Similarly, the HPLMN may receive from the VPLMN a public key associated with the VPLMN that the HPLMN can use to decrypt encrypted messages sent by the VPLMN.

In one example, the HPLMN and the VPLMN can exchange their respective public keys with one another as a prelude to sending/receiving encrypted data communications and related messaging. In another example, the HPLMN and VPLMN may exchange network certificates, within which their respective public keys are embedded. For example, the HPLMN may send the VPLMN a network certificate which includes a public key of an asymmetric private-public key pair associated with the HPLMN. Similarly, the VPLMN may send the HPLMN a network certificate which includes the public key of an asymmetric private-public key pair associated with the VPLMN. In each case, the network certificate sent by the HPLMN (hereinafter, "HPLMN certificate") and the network certificate sent by the VPLMN ("hereinafter "VPLMN certificate") may be digitally signed by trusted entity, such as a Certificate Authority (CA).

The term "network certificate" as described herein may be used interchangeably with "digital certificate." A network certificate is a construct that is created to link a public key to a particular entity and may be used as a form of electronic identification for the particular entity. A network certificate may be formed by taking a message payload such as the public key and identifying information (i.e. a name and address) of the particular entity and having the message payload signed by a certificate authority (CA).

The CA is a trusted entity that handles network certificates (i.e. digital certificates). The CA may correspond to the telecommunication network itself, namely the HPLMN or the VPLMN, or an independent third-party entity, with whom the HPLMN and VPLMN have an established trust relationship. By digitally signing a network certificate, a CA can provide the receiving entity with added assurance that the identity of the sending entity, is legitimate.

Moreover, this disclosure further describes techniques that facilitate generating encrypted messages for delivery between telecommunication networks. For example, consider a user device that initiates a communication session over a 5G-NR network, while roaming a VPLMN. In this example, a network controller of the VPLMN (hereinafter "VPLMN controller") may generate an encrypted message for delivery to a network controller of the HPLMN (hereinafter "VPLMN controller") within which the user device is subscribed.

The VPLMN controller may encrypt a message intended for the HPLMN controller using a private key of an asymmetric private-public key pair associated with the VPLMN controller. It is noteworthy that the private key is the counterpart to the public key shared with the HPLMN controller at an earlier point in time, either via an exchange of public keys or an exchange of network certificates.

In any case, the VPLMN controller may transmit the encrypted message to the HPLMN controller, knowing that the HPLMN controller may decrypt the encrypted message using the public key of the VPLMN controller that was shared with the HPLMN controller. Further, by virtue of decrypting the encrypted message, the HPLMN controller may verify the origin of the sending entity (i.e. VPLMN).

In some examples, the VPLMN controller may also append a digital signature to the encrypted message prior to sending the encrypted message to the HPLMN controller. The digital signature may provide the receiving entity with an added assurance that the message payload of the encrypted message remains unchanged since being sent by the VPLMN controller. The VPLMN controller may generate the digital signature by generating a hash of the message intended for the HPLMN controller using a digital signature algorithm, and further encrypting the hash using the private key of the VPLMN controller. The VPLMN controller may then append the digital signature to the encrypted message and transmit the encrypted message to the HPLMN controller.

The HPLMN controller may verify an authenticity of the message by performing a hash of the message via the same digital signature algorithm used for the digital signature, and comparing the hash generated from the message with the hash of the digital signature. A match between the generated hash and the hash of the digital signature would mean that the message payload remains unchanged since being sent.

This disclosure further describes a network certificate aggregator (NCA) that is configured to facilitate the routing of user-plane traffic associated with a user device that is roaming in a VPLMN. In various examples, the NCA may act as a certificate authority (CA) that verifies the identities of interacting HPLMNs and VPLMNs. In other words, the NCA may act as a trusted entity that generates and transmits network certificates associated with a HPLMN and one or more VPLMNs. The benefit of an NCA acting as a Certificate Authority is evident when a HPLMN interacts with a plurality of other VPLMNs. Rather than the HPLMN verifying an identity of each VPLMN, via each VPLMN's network certificate, individually, the HPLMN need only verify an identity of the NCA, which separately and independently, verifies the identity of each VPLMN.

In one non-limiting example, the NCA may acts as a conduit for user-plane traffic (i.e. data communications) between a HPLMN and a VPLMN. Data communications between the VPLMN and the HPLMN may be funneled through the NCA. Thus, the HPLMN and its counterpart VPLMN need only trust and verify an identity of the NCA.

In another example, the NCA may facilitate an exchange of public keys between a HPLMN controller and a VPLMN controller via an exchange of network certificates. In this example, the NCA may transmit a network certificate to the VPLMN controller that includes a public key associated with the HPLMN controller. The network certificate may be signed by the NCA using a private key of the NCA. The VPLMN controller may use a public key of the NCA (i.e. received independently at an earlier point in time) to decrypt the network certificate, and in doing so, verify that the network certificate was received from a trusted entity, namely the NCA, and that the message payload (i.e. public key of the HPLMN) is legitimate.

Similarly, the HPLMN may receive a network certificate signed by the NCA that includes a public key associated with the VPLMN. In this way, the HPLMN and VPLMN may each transmit encrypted messages to one another, with the knowledge that each counterpart network may decrypt the encrypted messages using the network public keys provided by the NCA.

The term "message" as used in the context of an "encrypted message" or "decrypted message" may interchangeably refer to an encrypted data communication or related messaging, or decrypted data communication or related messaging.

The term "data communication," as used throughout this disclosure, is intended to collectively describe voice, text, and data communications. Further, as discussed herein, the VPLMN represents a telecommunication network within which a user device is roaming, and the HPLMN represents a telecommunication network within which the user device is subscribed.

Further, the term "user-plane," as used herein, describes the content of a data communication, such as a text message, voice stream, photo, video, website link, or any combination thereof.

Further, the term "techniques," as used herein, may refer to system(s), method(s), computer-readable instruction(s), module(s), algorithms, hardware logic, and/or operation(s) as permitted by the context described above and through the document.

FIGS. 1A and 1B illustrate a computing environment 100 for generating end-to-end security for data communications between a HPLMN 102 and one or more VPLMN(s) 104(1)-104(N). Referring to FIG. 1A, the VPLMN 104(1) may include a VPLMN controller 106(1) that is configured to encrypt, decrypt, send, and receive encrypted messages (i.e. data communications) to and from other network controllers, such as the HPLMN controller 108. In the illustrated example, the VPLMN controller 106(1) may receive a data communication request 110 from a user device 112 that is roaming within the VPLMN 104(1). The data communication request 110 may include an identifier associated with the user device 112 that identifies a HPLMN 102 within which the user device 112 is subscribed. The identifier may correspond to a Public Land Mobile ID (PLMN ID), which includes a Mobile Country Code (MCC) and a Mobile Network Code (MNC), the combination of which identify the home telecommunication network of the user device 112. Alternatively, or additionally, the identifier may correspond to a Mobile Station International Subscriber Directory Number (MSISDN) or an International Mobile Subscriber Identity (IMSI).

In response to receiving the data communication request 110, or at a point in time prior to receiving the data communication request 110, the VPLMN controller 106(1) and the HPLMN controller 108 may exchange network public keys. In one example, the VPLMN controller 106(1) may transmit a VPLMN public key 114 to the HPLMN controller 108, and similarly, the HPLMN controller 108 may transmit a HPLMN public key 116 to the VPLMN controller 106(1). In another example, the VPLMN controller 106(1) and the HPLMN controller 108 may exchange network certificates, within which their respective public keys are embedded. The purpose of exchanging network public keys is to permit the HPLMN controller 108 to decrypt an encrypted message 118 sent by the VPLMN controller 106(1), and vice versa. In this way, the VPLMN controller 106(1) and the HPLMN controller 108 may exchange encrypted messages 118 as part of routing user-plane traffic 120 associated with the user device 112 to a data network 122, such as the Internet.

For purposes of clarity, FIG. 1A illustrates the HPLMN 102 interacting with one VPLMN, namely VPLMN 104(1). However, the techniques described within FIG. 1A and throughout this disclosure may apply to an interaction between the HPLMN 102 and one or more VPLMN(s) 104(1)-104(N).

Referring to FIG. 1B, a Network Certificate Aggregator (NCA) 124 may facilitate routing user-plane traffic 120 associated with a user device 112 that is roaming in a VPLMN(s) 104(1)-104(N). In the illustrated example, the NCA 124 may be configured to interact with the HPLMN controller 108 and one or more VPLMN controller(s) 106(1)-106(M). The NCA 124 may act as a conduit for user-plane traffic 120 (i.e. data communications) between the HPLMN 102 and one or more VPLMN(s) 104(1)-104(N). More specifically, data communications between the VPLMN(s) 104(1)-104(N) and the HPLMN 102 may be funneled through the NCA 124. Thus, the HPLMN controller 108 and its counterpart VPLMN controller(s) 106(1)-106(M) need only trust and verify an identity of the NCA 124.

The NCA 124 may also transmit a first network certificate 126 to VPLMN controller(s) 106(1)-106(M), which includes a public key of the HPLMN 102, and a second network certificate 128 to the HPLMN controller 108 that includes a public key of the VPLMN(s) 104(1)-104(N). In this way, the NCA 124 may facilitate an exchange of public keys between the HPLMN controller 108 and the VPLMN controller(s) 106(1)-106(M). Each network certificate 126 and 128 may be signed by the NCA 124 using an NCA private key. The VPLMN controller(s) 106(1)-106(M) and the HPLMN controller 108 can then use an NCA public key (i.e. the NCA public key having been independently sent to the VPLMN controller(s) 106(1)-106(M) and HPLMN controller 108 as part of a public key or network certificate exchange) to decrypt their respective network certificates 126 and 128. By decrypting their respective network certificates 126 and 128, the VPLMN controller(s) 106(1)-106(M) and the HPLMN controller 108 can verify an identity of the NCA 124, and in doing so, an authenticity of the public key embedded within their respective network certificates 126 and 128.

In the illustrated example, the HPLMN 102 and the VPLMN(s) 104(1)-104(N) may provide telecommunication and data communication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5G New Radio-LTE (5G NR-LTE), CDMA-2000 (Code Division Multiple Access 2000), and/or so forth. The computing environment 100 may include a core network that may provide telecommunication and data communication services to multiple computing devices, such as a 3G-compatible computing device and an LTE an LTE-compatible computing device, collectively referred to as computing device(s). Computing device(s) may include the user device 112 and may correspond to any sort of electronic device operating on the HPLMN 102 or the VPLMN(s) 104(1)-104(N), such as a cellular phone, a smart phone, a tablet computer, an electronic reader, a media player, a gaming device, a personal computer (PC, a laptop computer), etc. The computing device(s) may have a subscriber identity module (SIM), such as an eSIM, to identify the respective electronic device to a telecommunications service provider network (also referred to herein as "telecommunication network").

Additionally, the HPLMN controller 108, the VPLMN controller(s) 106(1)-106(M), and the network certificate aggregator (NCA) 124 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as user device 112 via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, LTE, 5G NR-LTE, and so forth), or any combination thereof.

Figure 2B:
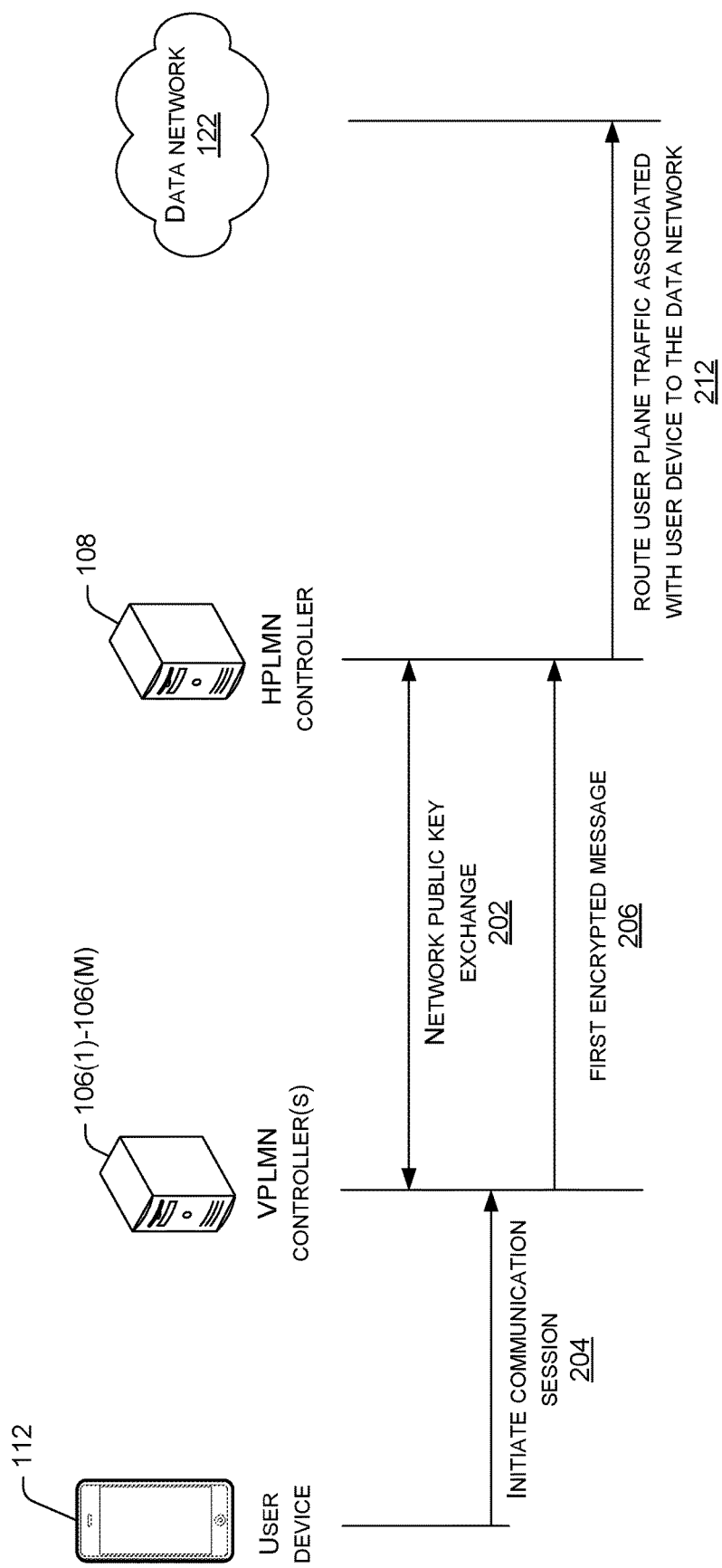

FIGS. 2A and 2B illustrate block diagrams of processes for routing user-plane traffic 120 to a data network 122 via one of VPLMN controller(s) 106(1)-106(M) or HPLMN controller 108 while a user device 112 is roaming in one or more VPLMN(s) 104(1)-104(N). FIG. 2A illustrates a process for routing user-plane traffic 120 via one of VPLMN controller(s) 106(1)-106(M) while a user device 112 is roaming within one of the VPLMN(s) 104(1)-104(N). FIG. 2B illustrates a process for routing user-plane traffic 120 via a HPLMN controller 108 while the user device 112 is roaming in one of the VPLMN(s) 104(1)-104(N).

Referring to FIG. 2A, the VPLMN controller(s) 106(1)-106(M) and the HPLMN controller 108 may exchange network public keys 202. The VPLMN controller(s) 106(1)-106(M) and the HPLMN controller 108 may exchange network public keys 202 directly with one another, or via network certificates. For example, the VPLMN controller(s) 106(1)-106(M) may transmit a public key of an asymmetric private-public key pair associated with the VPLMN 104(1) 104(N), to the HPLMN controller 108. Similarly, the HPLMN controller 108 may transmit a public key of an asymmetric private-public key pair associated with the HPLMN 102, to the VPLMN controller(s) 106(1)-106(M). As discussed earlier, the purpose of exchanging network public keys is to permit the HPLMN controller 108 to decrypt encrypted messages sent by the VPLMN controller(s) 106(1)-106(M). In some examples, the exchange of network public keys may also be used to decrypt a digital signature that is appended to an encrypted message. In this instance, by decrypting the digital signature, the receiving entity (i.e. HPLMN controller 108 or VPLMN controller(s) 106(1)-106(M)) may verify that the message payload of the encrypted message remains unchanged since being sent by the sending entity (i.e. VPLMN controller(s) 106(1)-106(M) or HPLMN controller 108).

At a point in time following the network public key exchange 202, the user device 112 may transmit a request to initiate a communication session 204 within a VPLMN 104(1). The request may include an identifier associated with the user device 112 along with a target Internet Protocol (IP) address. The identifier may correspond to a Public Land Mobile ID (PLMN ID), which includes a Mobile Country Code (MCC) and a Mobile Network Code (MNC), the combination of which identifies the HPLMN 102 associated with the user device 112. Alternatively, or additionally, the identifier may correspond to a Mobile Station International Subscriber Directory Number (MSISDN) or an International Mobile Subscriber Identity (IMSI).

Further, the VPLMN controller(s) 106(1)-106(M) may generate a first encrypted message 206 for delivery to the HPLMN controller 108. The first encrypted message 206 may include a header, a payload, and a digital signature. The header may include identifying information related to the VPLMN 104(1) and the HPLMN 102, and the digital signature algorithm (i.e. HMAC with SHA256, ECDSA, RSASSA-PSS, etc.) used to generate the digital signature. The payload may include the message intended for the HPLMN controller 108. In this example, the message may include the request to initiate the communications session 204.

The VPLMN controller(s) 106(1)-106(M) may encrypt the first message using a private key of an asymmetric private-public key pair associated with the VPLMN controller(s) 106(1)-106(M). The private key used to encrypt the first message may correspond to the counterpart of the public key associated with the VPLMN controller(s) 106(1)-106(M) that was sent to the HPLMN controller 108 as part of the network public key exchange 202.

In some examples, the VPLMN controller(s) 106(1)-106(M) may append a digital signature to the first encrypted message 206 for the purpose of permitting the HPLMN controller 108 to verify that the message payload of the first encrypted message 206 remains unchanged since being sent by the VPLMN controller(s) 106(1)-106(M). For example, the VPLMN controller(s) 106(1)-106(M) may generate the digital signature via a cryptographic hash of the first message (i.e. unencrypted) using a digital signature algorithm (i.e. HMAC with SHA256, ECDSA, RSASSA-PSS, etc.) and further encrypting the hash using the same private key used to generate the first encrypted message 206. The VPLMN controller(s) 106(1)-106(M) may then append the digital signature to the first encrypted message 206 and transmit the first encrypted message 206 to the HPLMN controller 108.

Upon receipt of the first encrypted message 206, the HPLMN controller 108 may decrypt the first encrypted message 206 using the public key of the VPLMN controller(s) 106(1)-106(M) that was received as part of the network public key exchange 202. By virtue of decrypting the first encrypted message 206, the HPLMN controller 108 may verify the origin (i.e. VPLMN controller(s) 106(1)-106(M)) of the first encrypted message 206. Moreover, the HPLMN controller 108 may decrypt a digital signature appended to the first encrypted message 206 using the same public key of the VPLMN controller(s) 106(1)-106(M). By virtue of decrypting the digital signature, the VPLMN controller(s) 106(1)-106(M) may determine that the message payload of the first encrypted message 206 (i.e. request to initiate a communication session 204) remains unchanged since being sent by the VPLMN controller(s) 106(1)-106(M).

Further, the HPLMN controller 108 may generate a second encrypted message 208 to acknowledge the validity of the VPLMN(s) 104(1)-104(N). In some examples, the second encrypted message 208 may include instructions for routing user-plane traffic 120 associated with the user device 112 via the VPLMN(s) 104(1)-104(N) or the HPLMN 102. In any case, the HPLMN controller 108 may generate the second encrypted message 208 by encrypting a second message using a private key of an asymmetric private-public key pair associated with the HPLMN controller 108. The private key may correspond to the counterpart of the public key exchanged with the VPLMN controller(s) 106(1)-106((M) as part of the network public key exchange 202.

In some examples, the HPLMN controller 108 may append a digital signature to the second encrypted message 208 for the purpose of permitting the VPLMN controller(s) 106(1)-106((M) to verify that the message payload of the second encrypted message 208 remains unchanged since being sent by the HPLMN controller 108. The HPLMN controller 108 may generate the digital signature via a cryptographic hash of the second message (i.e. unencrypted) using a digital signature algorithm (i.e. HMAC with SHA256, ECDSA, RSASSA-PSS, etc.) and further encrypting the hash using the same private key used to generate the second encrypted message 208. The HPLMN controller 108 may then append the digital signature to the second encrypted message 208 for delivery to the VPLMN controller(s) 106(1)-106(M).

Upon receipt of the second encrypted message 208, the VPLMN controller(s) 106(1)-106(M) may decrypt the second encrypted message 208 using the public key of the HPLMN 102 that was received as part of the network public key exchange 202. By virtue of decrypting the second encrypted message 208, the VPLMN controller(s) 106(1)-106(M) may verify the origin (i.e. HPLMN 102) of the second encrypted message 208. Moreover, the VPLMN controller(s) 106(1)-106(M) may decrypt a digital signature appended to the second encrypted message 208 using the same public key of the HPLMN controller 108 and further determine that the message payload of the second encrypted message 208 (i.e. acknowledgement of the validity of the VPLMN 104(1) and user-plane traffic 120 routing instructions) remains unchanged since being sent by the HPLMN controller 108.

In one example, in response to the decrypting the second encrypted message 208, the VPLMN controller(s) 106(1)-106(M) may determine that the user-plane traffic 120 is to be routed to the data network via the VPLMN(s) 104(1)-104(N). In doing so, the VPLMN controller(s) 106(1)-106(M) may generate computer-executable instructions that cause the VPLMN(s) 104(1)-104(N) to route user-plane traffic 210 associated with the user device 112 to the data network 122.

Referring to FIG. 2B, the illustrated example includes various steps that are the same or substantially similar to the process described with reference to FIG. 2A, except for the routing of user-plane traffic 120 via the HPLMN 102. As such, for brevity and ease of description, various details relating to the process described in FIG. 2B are omitted herein to the extent that the same or similar details have been provided above in relation to FIG. 2A.

Upon receipt of the first encrypted message 206, the HPLMN controller 108 may decrypt the first encrypted message 206 using the public key of the VPLMN controller(s) 106(1)-106(M) that was received as part of the network public key exchange 202. In response to decrypting the first encrypted message 206, the HPLMN controller 108 may determine that the user-plane traffic 120 associated with the user device 112 is to be routed via the HPLMN 102. In doing so, the HPLMN controller 108 may generate computer-executable instructions that cause the HPLMN 102 to route user-plane traffic 212 associated with the user device 112 to the data network 122.

Figure 3A:
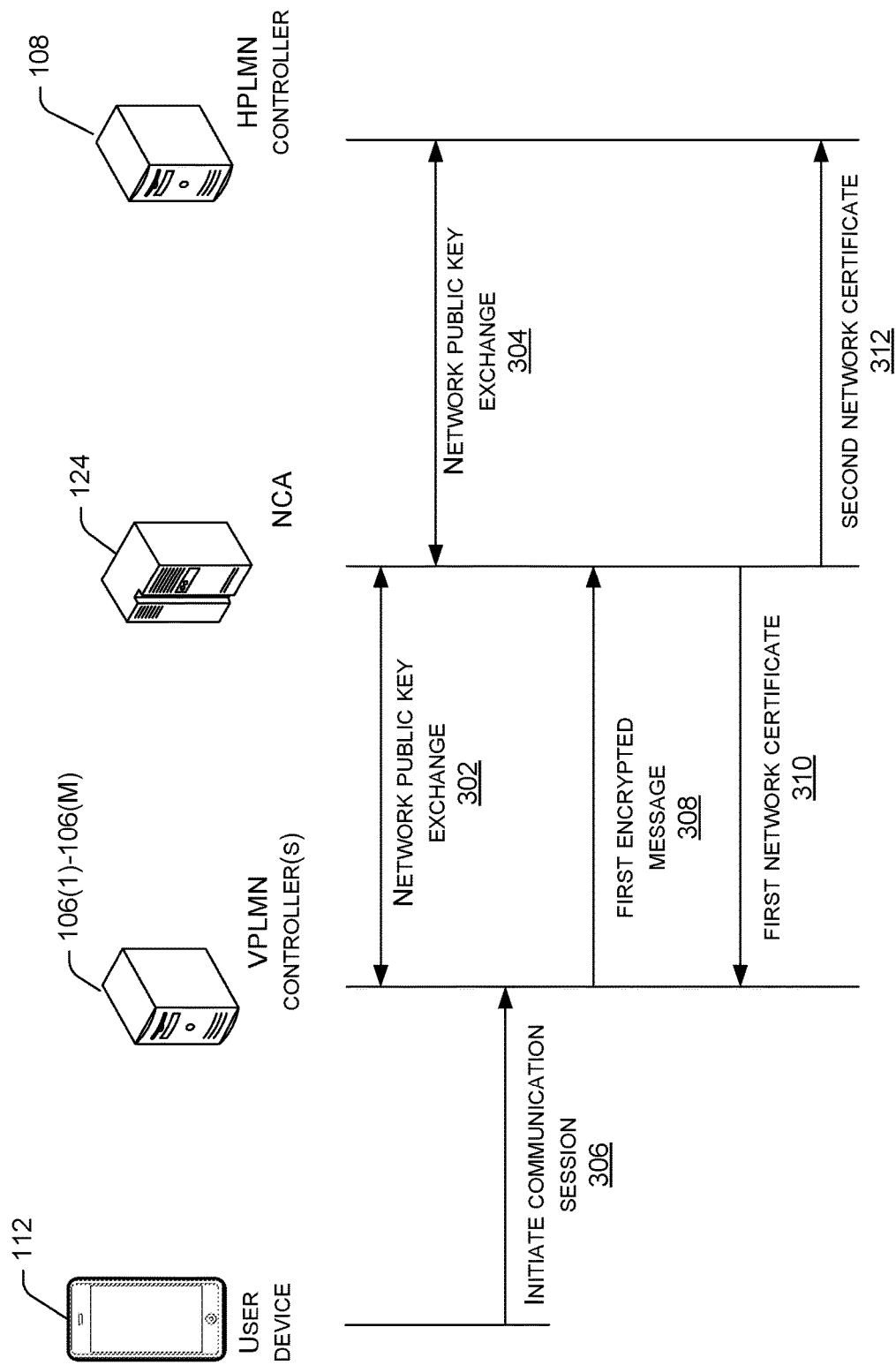
Figure 3C:
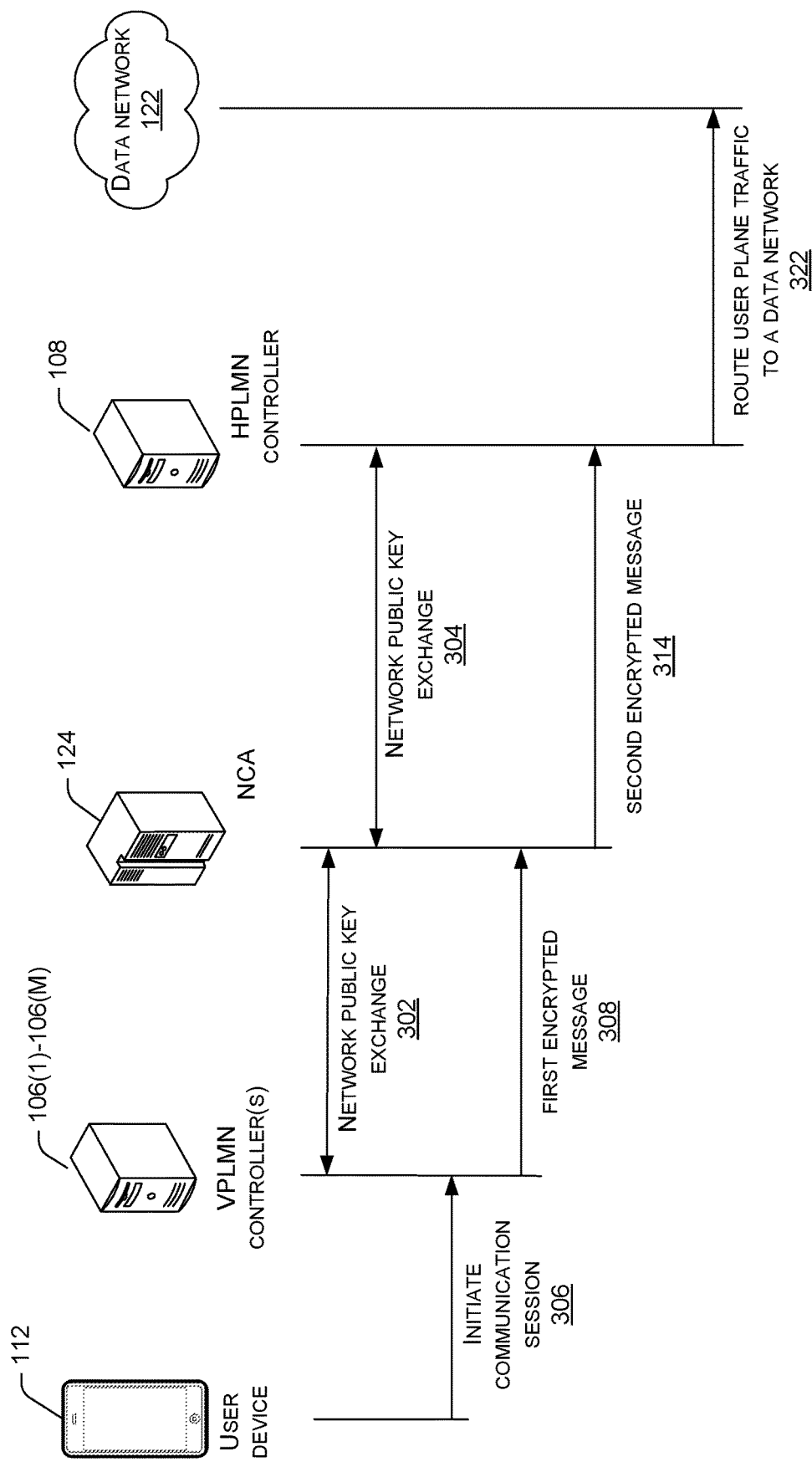

FIGS. 3A, 3B, and 3C illustrate block diagrams of processes for a network certificate aggregator (NCA) to facilitate routing user-plane traffic associated with a user device roaming in a VPLMN.

Referring to FIG. 3A, the NCA 124 may facilitate an exchange of network public keys between a VPLMN controller(s) 106(1)-106(M) and a HPLMN controller 108. The VPLMN controller(s) 106(1)-106(M) and the HPLMN controller 108 may exchange network public keys 202 directly with one another, or via network certificates. For example, the VPLMN controller(s) 106(1)-106(M) may transmit a public key of an asymmetric private-public key pair associated with the VPLMN(s) 104(1)-104(N) to the NCA 124. In exchange, the NCA 124 may transmit a public key of an asymmetric private-public key pair associated with the NCA 124 to the VPLMN controller(s) 106(1)-106(M). Similarly, as part of a network public key exchange 304, the HPLMN controller 108 may transmit a public key of an asymmetric private-public key pair associated with the HPLMN 102 to the NCA 124, and in exchange, the NCA 124 may transmit a public key of an asymmetric private-public key pair associated with the NCA 124 to the HPLMN controller 108.

At a point in time following the network public key exchanges 302 and 304, a user device 112 may transmit a request to initiate a communication session 306 within the VPLMN(s) 104(1)-104(N). The request may include an identifier, which may be used to identify the HPLMN 102 associated with the user device 112. Upon receipt of the request to initiate a communication session 306, the VPLMN controller(s) 106(1)-106(M) may transmit a first encrypted message 308 to the NCA 124, which in turn, may decrypt the first encrypted message 308 using the public key that the NCA 124 received earlier from the VPLMN controller(s) 106(1)-106(M).

In response to decrypting the first encrypted message 308, the NCA 124 may determine the identity of the VPLMN(s) 104(1)-104(N) and HPLMN 102, and act to facilitate the transmission of encrypted communications between the VPLMN controller(s) 106(1)-106(M) and the HPLMN controller 108. By way of example, the NCA 124 may initiate an exchange of network public keys between the HPLMN controller 108 and the VPLMN controller(s) 106(1)-106(M) via a first network certificate 310 and a second network certificate 312. In this example, the NCA 124 may transmit the first network certificate 310 to the VPLMN controller(s) 106(1)-106(M), which includes the public key associated with the HPLMN controller 108. Similarly, the NCA 124 may transmit the second network certificate 312 to the HPLMN controller 108, which includes the public key of the VPLMN controller(s) 106(1)-106(M).

Each network certificate 310 and 312 may be signed by the NCA 124 using a private key of an asymmetric private-public key pair associated with the NCA 124. The private key may correspond to the counterpart of the public key associated with the NCA 124 that was sent to each of the VPLMN controller(s) 106(1)-106(M) and the HPLMN controller 108 as part of the network public key exchanges 302 and 304. In this regard, the VPLMN controller(s) 106(1)-106(M) and the HPLMN controller 108 may decrypt their respective network certificates 310 and 312 using the public key of the NCA 124. By virtue of decrypting their respective network certificates, the HPLMN controller 108 and the VPLMN controller(s) 106(1)-106(M) may also verify the origin of the message payload (i.e. public key of the counterpart network).

Moreover, once the HPLMN controller 108 and the VPLMN controller(s) 106(1)-106(M) have decrypted their respective network certificates 310 and 312, each now has access to their counterpart network's public key (i.e. HPLMN controller 108 has access to the public key of the VPLMN controller 106(1)-106(M), and vice versa). Thus, as discussed earlier with reference to FIGS. 2A and 2B, the VPLMN controller(s) 106(1)-106(M) and the HPLMN controller 108 may decrypt encrypted messages sent by each other, using their counterpart's public key.

Referring to FIG. 3B, the NCA 124 may act as a conduit for data communications between a HPLMN 102 and a VPLMN(s) 104(1)-104(N). More specifically, data communications between the VPLMN(s) 104(1)-104(N) and the HPLMN 102 may be funneled through the NCA 124. Thus, the HPLMN controller 108 and its counterpart VPLMN controller(s) 106(1)-106(M) need only trust and verify an identity of the NCA 124.

In general, the process described in FIG. 3B includes various steps that are the same or substantially similar to the process described with reference to FIG. 3A. As such, for brevity and ease of description, various details relating to the process described in FIG. 3B may be omitted herein to the extent that the same or similar details have been provided above in relation to FIG. 3A.

In the illustrated example of FIG. 3B, following the network public key exchanges 302 and 304, and following receipt of the request to initiate a communication session 306, the VPLMN controller(s) 106(1)-106(M) may transmit a first encrypted message 308 to the NCA 124.

The first encrypted message 308 may comprise of a first message that includes, within its payload, the request to initiate the communication session 306 sent by the user device 112. The VPLMN controller(s) 106(1)-106(M) may generate the first encrypted message 308 by encrypting the first message using a private key of an asymmetric private-public key pair associated with the VPLMN controller(s) 106(1)-106(M). The private key may correspond to the counterpart of the public key associated with the VPLMN controller(s) 106(1)-106(M) that was part of the network public key exchange 302.

Moreover, the NCA 124 may validate an identity of the VPLMN(s) 104(1)-104(N) by decrypting the first encrypted message 308 using the public key of the VPLMN controller(s) 106(1)-106(M) that was part of the network public key exchange 302.

In response to decrypting and analyzing the first encrypted message 308, the NCA 124 generate a second encrypted message 314 for delivery to the HPLMN controller 108. The second encrypted message 314 may comprise of a second message that includes, within its payload, the request to initiate the communication session 306, as received from the VPLMN controller(s) 106(1)-106(M).

Specifically, the NCA 124 may generate the second encrypted message 314 by encrypting the second message using a private key of an asymmetric key pair associated with the NCA 124. The private key may correspond to the counterpart of the public key associated with the NCA 124 that was part of the network public key exchange 302.

In some examples, the NCA 124 may append a digital signature to the second encrypted message 314 for the purpose of permitting the HPLMN controller 108 to verify that the message payload of the second encrypted message 314 remains unchanged since being sent by the NCA 124. The NCA 124 may generate the digital signature via a cryptographic hash of the second message using a digital signature algorithm (i.e. HMAC with SHA256, ECDSA, RSASSA-PSS, etc.) and further encrypting the hash using the private key used to generate the second encrypted message 314. The NCA 124 may append the digital signature to the second encrypted message 314 message and transmit the second encrypted message 314 to the HPLMN controller 108.

Upon receipt of the second encrypted message 314, the HPLMN controller 108 may decrypt the second encrypted message 314 using the public key of the NCA 124 that the HPLMN controller 108 received from the NCA 124 as part of the network public key exchange 304. In doing so, the HPLMN controller 108 may analyze the message payload (i.e. unencrypted) of the second encrypted message 314 and generate a third encrypted message 316 for delivery to the NCA 124. The third encrypted message 316 may comprise a third message that includes, within its payload, an acknowledgement of the validity of the VPLMN(s) 104(1)-104(N). In some examples, the third message may include instructions for routing user-plane traffic 120 associated with the user device 112 via the VPLMN(s) 104(1)-104(N) or the HPLMN 102.

The HPLMN controller 108 may generate the third encrypted message 316 by encrypting the third message using a private key of an asymmetric key pair associated with the HPLMN controller 108. The private key may correspond to the counterpart of the public key associated with the HPLMN controller 108 that was part of the network public key exchange 304.

In some examples, the HPLMN controller 108 may append a digital signature to the third encrypted message 316 for the purpose of permitting the NCA 124 to verify that the message payload of the third encrypted message 316 remains unchanged since being sent by the HPLMN controller 108. The HPLMN controller 108 may generate the digital signature via a cryptographic hash of the third message using a digital signature algorithm (i.e. HMAC with SHA256, ECDSA, RSASSA-PSS, etc.) and further encrypting the hash using the private key used to generate the third encrypted message 316. The HPLMN controller 108 may append the digital signature to the third encrypted message 316 and transmit the third encrypted message 316 to the NCA 124.

Upon receipt of the third encrypted message 316, the NCA 124 may decrypt the third encrypted message 316 using the public key of the HPLMN controller 108 that was received as part of the network public key exchange 304. In doing so, the NCA 124 may analyze the message payload (i.e. unencrypted) of the third encrypted message 316 and generate a fourth encrypted message 318 for delivery to the VPLMN controller(s) 106(1)-106(M). The fourth encrypted message 318 may comprise a fourth message that includes, within its payload, instructions for the VPLMN(s) 104(1)-104(N) to route user-plane traffic 120 associated with the user device 112 to the data network 122.

The NCA 124 may generate the fourth encrypted message 318 by encrypting the fourth message using a private key of an asymmetric key pair associated with the NCA 124. The private key may correspond to the counterpart of the public key associated with the NCA 124 that was part of the network public key exchange 302.

In some examples, the NCA 124 may append a digital signature to the fourth encrypted message 318 for the purpose of permitting the VPLMN controller(s) 106(1)-106(M) to verify that the message payload of the fourth encrypted message 318 remains unchanged since being sent by the NCA 124. The NCA 124 may generate the digital signature via a cryptographic hash of the fourth message using a digital signature algorithm (i.e. HMAC with SHA256, ECDSA, RSASSA-PSS, etc.) and further encrypting the hash using the private key used to generate the fourth encrypted message 318. The NCA 124 may append the digital signature to the fourth encrypted message 318 and transmit the fourth encrypted message to the VPLMN controller(s) 106(1)-106(M).

Upon receipt of the fourth encrypted message 318, the VPLMN controller(s) 106(1)-106(M) may decrypt the fourth encrypted message 318 using the public key of the NCA 124 that was received as part of the network public key exchange 302. In doing so, the VPLMN controller(s) 106(1)-106(M) may analyze the message payload (i.e. unencrypted) of the fourth encrypted message 318 and, in doing so, selectively generate computer-executable instructions that route the user-plane traffic 320 from the VPLMN(s) 104(1)-104(N) to the data network 122.

FIG. 3C illustrates a block diagram of a process for routing user-plane traffic 120 to a data network 122 via the HPLMN 102 while a user device 112 is roaming within VPLMN(s) 104(1)-104(N). In general, the process described in FIG. 3C includes various steps that are the same or substantially similar to the process described with reference to FIGS. 3A and 3B. As such, for brevity and ease of description, various details relating to the process described in FIG. 3C may be omitted herein to the extent that the same or similar details have been provided above in relation to FIGS. 3A and 3B.

Referring to FIG. 3C, upon receipt of the second encrypted message 314, the HPLMN controller 108 may decrypt the second encrypted message 314 using the public key of the NCA 124 that was received as part of the network public key exchange 304. In response to decrypting the second encrypted message 314, the HPLMN controller 108 may determine that the user-plane traffic 120 associated with the user device 112 is to be routed via the HPLMN 102. In doing so, the HPLMN controller 108 may generate computer-executable instructions that route 322 the user-plane traffic 120 from the HPLMN 102 to the data network 122.

Figure 4:
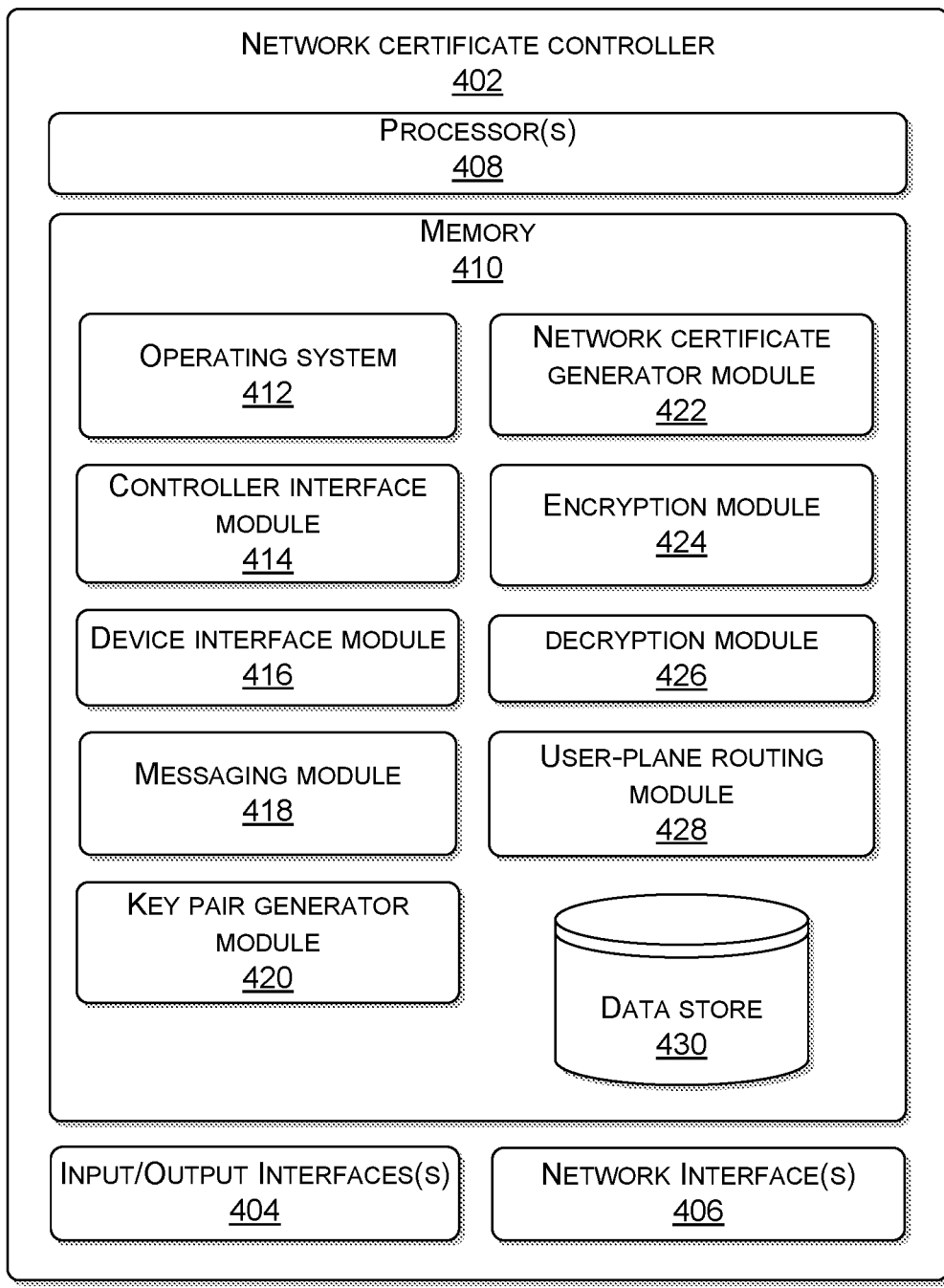
FIG. 4 illustrates a block diagram of various components of a network certificate controller.

FIG. 4 illustrates a block diagram of various components of a network certificate controller 402. The network certificate controller may correspond to the HPLMN controller 108 or the VPLMN controller(s) 106(1)-106(M). In various examples, the network certificate controller 402 may be integrated within an underlying network, namely a VPLMN(s) 104(1)-104(N) or a HPLMN 102, as depicted in FIGS. 1A and 1B. The network certificate controller 402 may include input/output interface(s) 404. The input/output interface(s) 404 may include any type of output interface known in the art, such as a display (e.g. a liquid crystal display), speakers, a vibrating mechanism, or a tactile feedback mechanism. Input/output interface(s) 404 also include ports for one or more peripheral devices, such as headphones, peripheral speakers, or a peripheral display. Further, the input/output interface(s) 404 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the network certificate controller 402 may include network interface(s) 406. The network interface(s) 406 may include any sort of transceiver known in the art. For example, the network interface(s) 406 may include a radio transceiver that performs the function of transmitting and receiving radio frequency communications via an antenna. In addition, the network interface(s) 406 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 406 may include wired communication components, such as an Ethernet port or a Universal Serial Bus (USB).

Further, the network certificate controller 402 may include one or more processor(s) 408 that are operably connected to memory 410. In at least one example, the one or more processor(s) 408 may be a central processing unit(s) (CPU), graphics processing unit(s) (GPU), or both a CPU and GPU, or any other sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 408 may also be responsible for executing all computer applications stored in the memory, which can be associated with common types of volatile (RAM) and/or nonvolatile (ROM) memory.

In some examples, memory 410 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 410 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 410 may include an operating system 412, a controller interface module 414, a device interface module 416, a messaging module 418, a key pair generator module 420, a network certificate generator module 422, an encryption module 424, a decryption module 426, a user-plane routing module 428, and a data store 430. The operating system 412 may be any operating system capable of managing computer hardware and software resources. The operating system 412 may include an interface layer that enables applications to interface with the input/output interface(s) 404 and the network interface(s) 406. The interface layer may comprise public APIs, private APIs, or a combination of both. Additionally, the operating system 412 may include other components that perform various other functions generally associated with an operating system.

The controller interface module 414 may send and/or receive one or more encrypted messages to and/or from another network certificate controller of a different telecommunication network (i.e. HPLMN or VPLMN). Alternatively, or additionally, the controller interface module 414 may send and/or receive one or more encrypted messages to and/or from a network certificate aggregator. The controller interface module 414 may also send and/or receive public keys, or network certificates, that are part of a network public key exchange. For example, the controller interface module 414 may send a public key of an asymmetric private-public key pair generated by the key pair generator module 420, to another network certificate controller of a different telecommunication network or a network certificate aggregator. Further, the controller interface module 414 may receive public keys from other network certificate controllers associated with different telecommunication networks (i.e. HPLMN or VPLMN) or a network certificate aggregator, as described earlier with reference to FIGS. 2A, 2B, and FIGS. 3A through 3C.

The device interface module 416 may enable a user device to provide input to the network certificate controller 402 and receive output from the network certificate controller 402. Example data input may include a message payload that is intended to initiate a communication session between a user device and a data network. Another example data input may include a selection of a HPLMN and/or a VPLMN.

The messaging module 418 may use one or more message generation algorithms to generate message content (i.e. message payload) that is to be encrypted and transmitted between the network certificate controller 402 of a network and other network certificate controllers of different telecommunication networks (i.e. HPLMN or VPLMN), or a network certificate aggregator.

The key pair generator module 420 may generate the asymmetric private-public key pair associated with the underlying network (i.e. HPLMN or VPLMN) using a key generation algorithm, such as the Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm.

The network certificate generator module 422 may generate network certificates that facilitate delivery of a network public key generated by the key pair generator module 420 to another network certificate controller, or a network certificate aggregator. The network certificate may comprise of a message payload that includes the public key generated by the key pair generator module 420 and identifying information (i.e. a name and address) of the network certificate controller 402. The network certificate may be digitally signed by a certificate authority (CA) using a private key of an asymmetric private-public key pair associated with the CA. The CA may correspond to the network certificate controller 402 itself, or an independent third-party entity, with whom the network certificate controller 402 has an established trust relationship. By digitally signing the network certificate, the CA can provide the receiving entity (i.e. network certificate controller receiving the network certificate) with an added assurance that the identity of the sending entity (i.e. network certificate controller 402), is legitimate.

The encryption module 424 may generate one or more encrypted message(s) for delivery to another network controller. Specifically, the encryption module 424 may encrypt a message generated by the messaging module 418 using a private key of an asymmetric private-public key pair generated by the key pair generator module 420. The private key used to encrypt messages may correspond to the counterpart of the public key that is sent by the controller interface module 414 to a receiving network certificate controller (i.e. receiving entity).

In some examples, the encryption module 424 may generate and append a digital signature to an encrypted message prior to sending the encrypted message to the receiving network certificate controller. The digital signature may provide the receiving network certificate controller with an added assurance that the message payload of an encrypted message remains unchanged since being sent via the controller interface module 414. The encryption module 424 may generate the digital signature via a cryptographic hash of a message generated by the messaging module 418, using a digital signature algorithm, such as one of HMAC with SHA256, ECDSA, RSASSA-PSS, and further encrypting the hash using the private key used the encrypt the message. The encryption module 424 may then append the digital signature the message to generate an encrypted message.

The decryption module 426 may decrypt an encrypted message and/or digital signature received at the controller interface module 414. In various examples, the decryption module 426 may extract an identifier associated with the sending entity of an encrypted message from the header of the encrypted message, and in turn, use the identifier to retrieve a public key from the data store 430 to decrypt the encrypted message. The decryption module 426 may also extract an identifier associated with a digital signature algorithm used for a digital signature from the header of an encrypted message. In response to the controller interface module 414 receiving an encrypted message with an appended digital signature, the decryption module 426 may generate a hash of the unencrypted message using the identified digital signature algorithm and compare the hash to the digital signature appended to the encrypted message. A match between the generated hash and the hash of the digital signature would mean that the message payload of the encrypted message remains unchanged since being sent by the sending entity.

The user-plane routing module 428 may determine whether to route user-plane traffic associated with a user device to a data network. Moreover, the user-plane routing module 428 may generate computer-executable instructions that route user-plane traffic associated with a user device to the data network.

The data store 430 may include a repository of public keys associated with interacting networks (i.e. HPLMN or VPLMNs) and a public key associated with an interacting network certificate aggregator.

Figure 5:
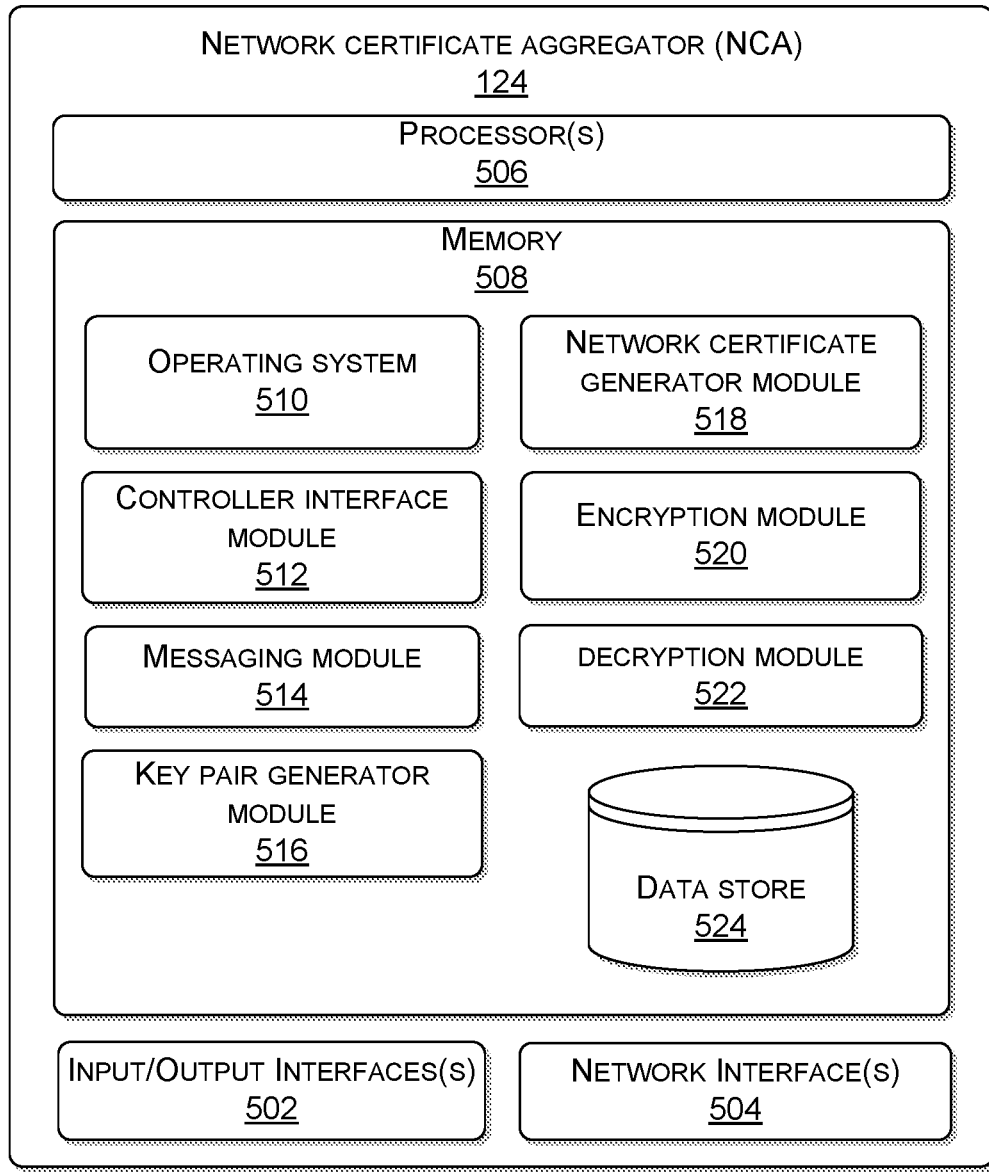
FIG. 5 illustrates a block diagram of various components of a network certificate aggregator.

FIG. 5 illustrates a block diagram of various components of a network certificate aggregator (NCA) 124. The NCA 124 may be configured to interact with one or more telecommunication networks, namely the HPLMN 102 and one or more VPLMN(s) 104(1)-104(N), as depicted in FIGS. 1A and 1B. Further, the NCA 124 may act as a conduit for user-plane traffic between the telecommunication networks, and a certificate authority (CA) that verifies the identities of interacting telecommunication networks.

The NCA 124 may include input/output interface(s) 502 and network interface(s) 504. The input/output interface(s) 502 may be similar to the input/output interface(s) 404 and the network interface(s) 504 may be similar to the network interface(s) 406.

The NCA 124 may include one or more processor(s) 506 that are operably connected to memory 508. The one or more processor(s) 506 may be similar to the one or more processor(s) 408 and the memory 508 may be similar to the memory 410.

In the illustrated example, the memory 508 may include an operating system 510, a controller interface module 512, a messaging module 514, a key pair generator module 516, a network certificate generator module 518, an encryption module 520, a decryption module 522, and a data store 524.

The operating system 510 may be any operating system capable of managing computer hardware and software resources. The operating system 510 may include an interface layer that enables applications to interface with the input/output interface(s) 502 and the network interface(s) 504. The interface layer may comprise public APIs, private APIs, or a combination of both. Additionally, the operating system 510 may include other components that perform various other functions generally associated with an operating system.

The controller interface module 512 may send and/or receive one or more encrypted messages to and/or from network certificate controllers of one or more telecommunication network(s) (i.e. HPLMN or VPLMN). The controller interface module 512 may also send and/or receive public keys that are part of a network public key exchange with each network certificate controller. For example, the controller interface module 512 may send a public key of an asymmetric private-public key pair generated by the key pair generator module 516, to a network certificate controller of a telecommunication network (i.e. HPLMN or VPLMN). The controller interface module 512 may also send and/or receive public keys associated with telecommunication networks (i.e. HPLMN or VPLMN) that intend to interact with one another via the NCA 124.

The messaging module 514 may use one or more message generation algorithms to generate message content (i.e. message payload) that is to be encrypted and transmitted to network certificate controllers of one or more telecommunication network(s) (i.e. HPLMN or VPLMN).

The key pair generator module 516 may generate the asymmetric private-public key pair associated with the NCA 124 using a key generation algorithm, such as the Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm.

The network certificate generator module 518 may generate network certificates that facilitate delivery of a network public key associated with a HPLMN or a VPLMN, from the NCA 124 to a counterpart telecommunication network (i.e. VPLMN or HPLMN). More specifically, the network certificate may comprise of a message payload that includes the public key associated with the HPLMN or the VPLMN along with corresponding identifying information (i.e. a name and address). The network certificate generator module 518 may digitally sign the network certificate, thereby acting as a Certificate Authority. By digitally signing the network certificate, the network certificate generator module 518 can provide the receiving entity (i.e. network certificate controller receiving the network certificate) with an added assurance that the identity of the public keys within the message payload of the network certificate, are legitimate. The added assurance is based on an independently established trust relationship between the NCA 124 and the receiving entity (i.e. via an exchange of public keys).

The encryption module 520 may generate one or more encrypted message(s) for delivery to a network certificate controller of a telecommunication network. Specifically, the encryption module 50 may encrypt a message generating by the messaging module 514 using a private key of an asymmetric private-public key pair generated by the key pair generator module 516. The private key used to encrypt message may correspond to the counterpart of the public key that is send by the controller interface module 512 to a receiving network certificate controller (i.e. receiving entity).

In some examples, the encryption module 520 may generate and append a digital signature to an encrypted message prior to sending the encrypted message to a receiving network certificate controller. The digital signature may provide the receiving network certificate controller with an added assurance that the message payload of an encrypted message remains unchanged since being sent via the controller interface module 512. The encryption module 520 may generate the digital signature via a cryptographic hash of a message generated by the messaging module 514 using a digital signature algorithm, such as one of HMAC with SHA256, ECDSA, RSASSA-PSS, and/or so forth. The encryption module 520 may further encrypt the hash using the private key used to encrypt the message. The encryption module 520 may then append the digital signature to the message to generate an encrypted message.

The decryption module 522 may decrypt an encrypted message and/or digital signature received at the controller interface module 512. In various examples, the decryption module 522 may extract an identifier associated with the sending entity of an encrypted message from the header of the encrypted message, and in turn, use the identifier to retrieve a public key from the data store 524 to decrypt the encrypted message. The decryption module 522 may also extract an identifier associated with a digital signature algorithm used for a digital signature from the header of an encrypted message. In response to the controller interface module 512 receiving an encrypted message with an appended digital signature, the decryption module 522 may generate a hash of the unencrypted message using the identified digital signature algorithm and compare the hash to the digital signature appended to the encrypted message. A match between the generated hash and the hash of the digital signature would mean that the message payload of the encrypted message remains unchanged since being sent by the sending entity.

The data store 524 may include a repository of public keys associated with interacting telecommunication networks (i.e. HPLMN and/or one or more VPLMN(s)). In some examples, the data store 524 may include a record that specifies how to route user-plane traffic between a HPLMN and VPLMN. In some examples, the record may correspond to a Service Level Agreement (SLA) between the HPLMN and the VPLMN.

Figure 6:
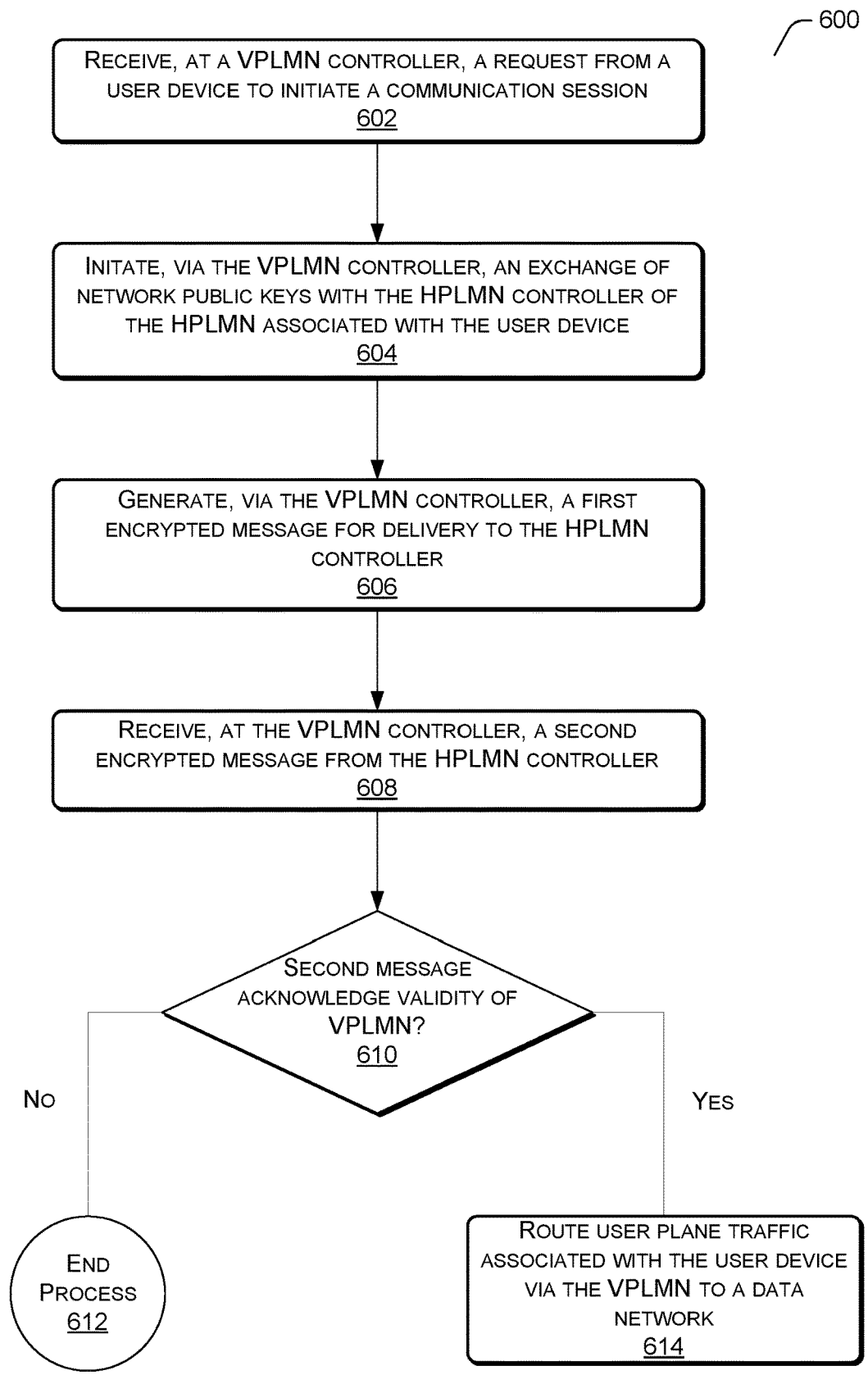
FIG. 6 illustrates a process for routing user-plane traffic to a data network via a VPLMN while a user device is roaming in the VPLMN.
Figure 7:
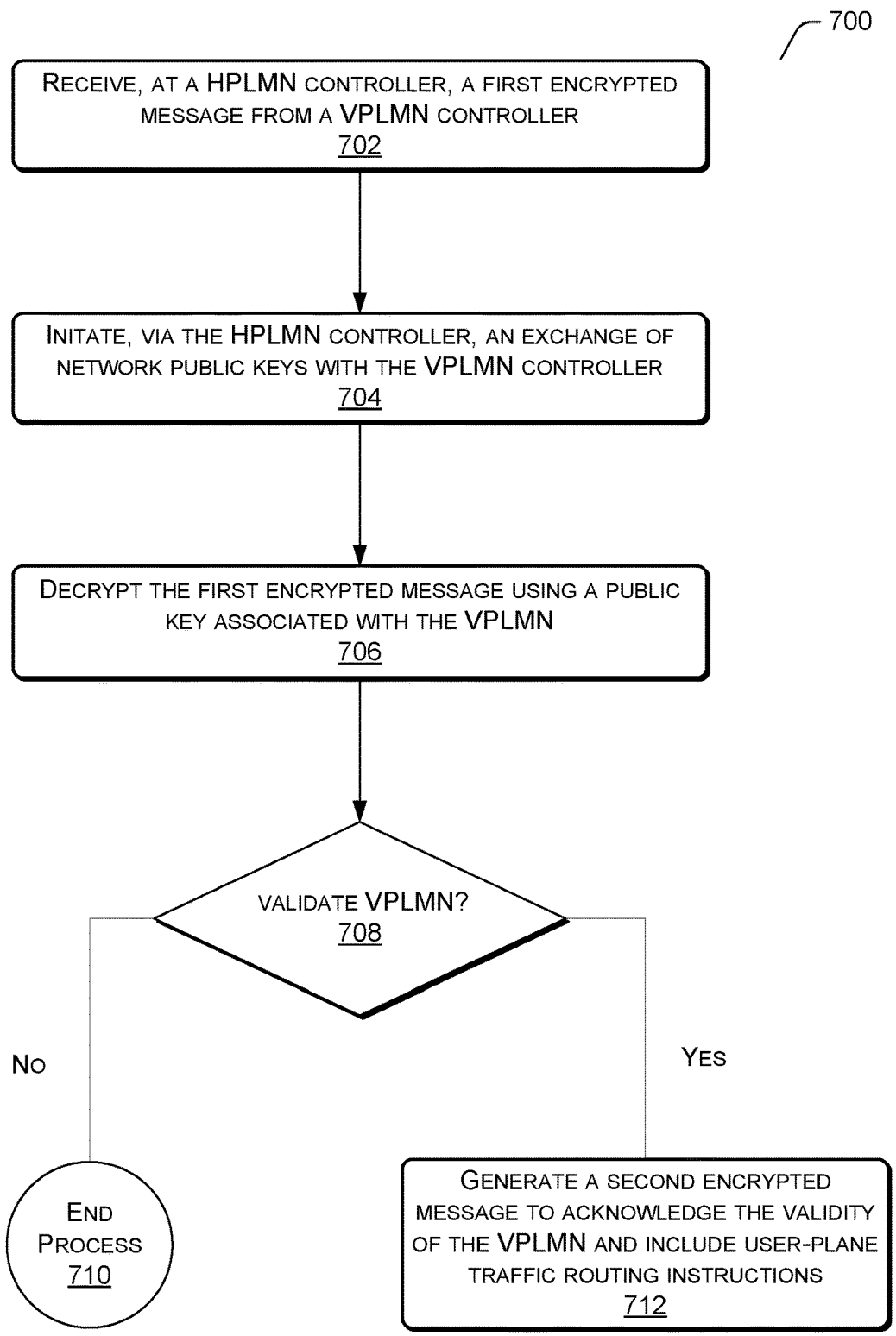
FIG. 7 illustrates a process for a HPLMN controller to verify an identity of a VPLMN, based at least in part on an exchange of network public keys.
Figure 8:
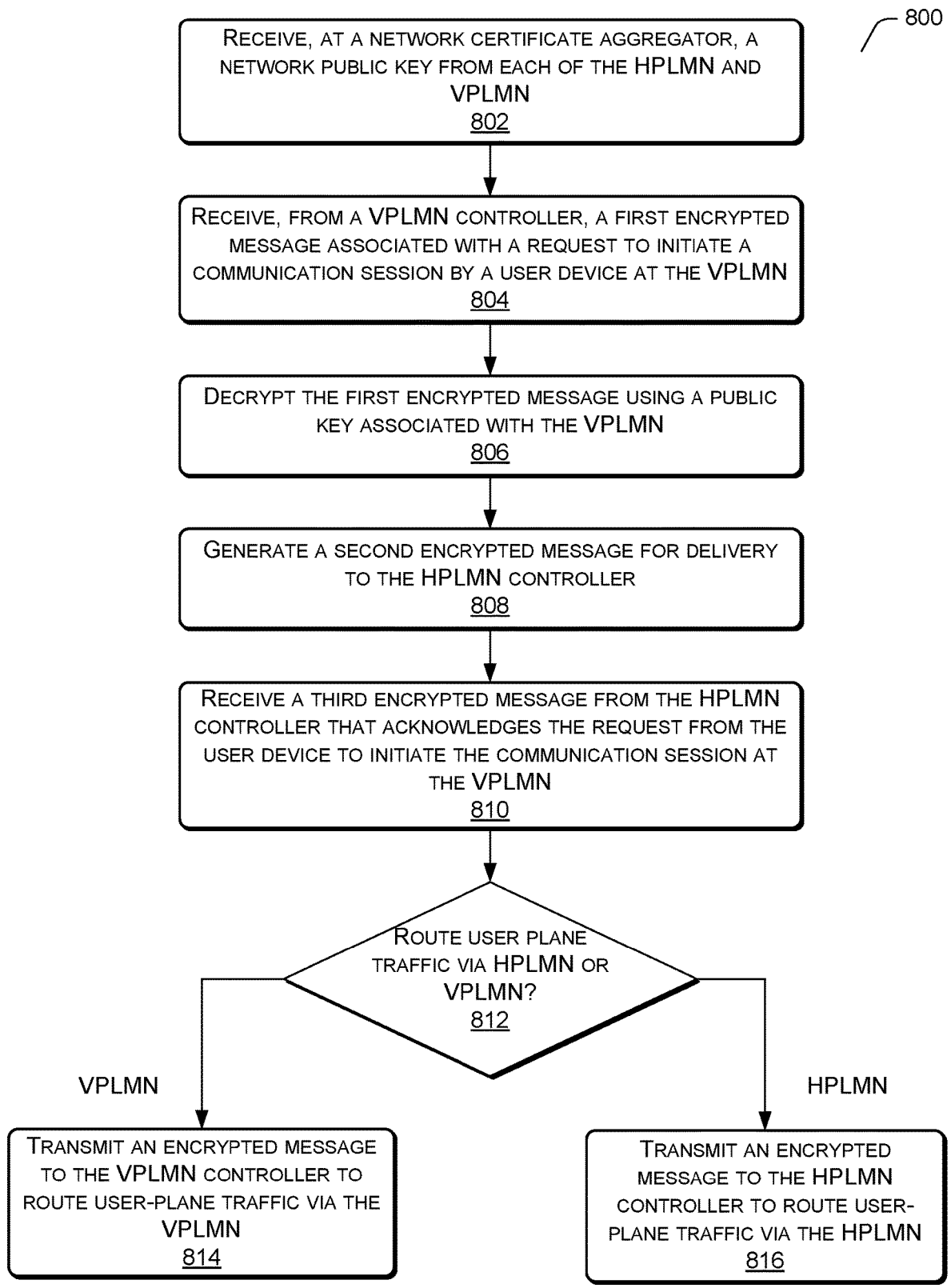
FIG. 8 illustrates a process for a network certificate aggregator (NCA) to facilitate the routing of user-plane traffic associated with a user device roaming in a VPLMN.

FIGS. 6, 7, and 8 present processes 600, 700, and 800 that relate to operations of the network certificate aggregator and network certificate controllers. Each of processes 600, 700, and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600, 700, and 800 are described with reference to the computing environment 100 of FIG. 1.

FIG. 6 illustrates process 600 for routing user-plane traffic to a data network via a VPLMN controller while a user device is roaming within the VPLMN. In this example, process 600 is described from the perspective of the VPLMN controller, which receives a request to initiate a communication session from a user device associated with a HPLMN.

At 602, the VPLMN controller may receive, from a user device, a request to initiate a communication session with a data network. The data network may correspond to the Internet and the communication session may identify a target Internet Protocol (IP) address. In one example, the request may include an identifier associated with the user device that identifies a HPLMN within which the user device is subscribed.

At 604, the VPLMN controller may initiate an exchange of network public keys with a HPLMN controller of the HPLMN associated with the user device. Alternatively, the VPLMN controller and the HPLMN controller may exchange network certificates, within which their network public keys are embedded. It is noteworthy that the exchange of network public keys—or network certificates—may occur in response to step 602, namely receiving the request from the user device, or at an earlier point in time.

At 606, the VPLMN controller may generate a first encrypted message for delivery to the HPLMN controller. The VPLMN controller may encrypt the first encrypted message using a private key of the VPLMN controller that is a counterpart to the public key exchanged with the HPLMN controller in step 604. Further, the first encrypted message may include the request to initiate the communication session from the user device.

In some examples, the VPLMN controller may generate and append a digital signature to the first encrypted message. The digital signature may permit the HPLMN controller to verify that the message payload of the first encrypted message remains unchanged since being sent by the VPLMN controller. The VPLMN controller may generate the digital signature via a cryptographic hash of the first message (i.e. unencrypted) using a digital signature algorithm and further encrypting the hash using the same private key used to generate the encrypted message. The VPLMN controller may append the digital signature to the first encrypted message and transmit the first encrypted message to the HPLMN controller.

At 608, the VPLMN controller may receive a second encrypted message from the HPLMN controller. The VPLMN controller may use the public key of the HPLMN (i.e. received at step 604) to decrypt the first encrypted message. In some examples, whereby a digital signature is appended to the first encrypted message, the VPLMN controller may perform a hash of the first message (i.e. unencrypted) via the same digital signature algorithm used for the digital signature, and compare the hash generated from the first message with the hash of the digital signature. A match between the generated hash and the hash of the digital signature would mean that the message payload remains unchanged since being sent by the HPLMN controller.

At 610, the VPLMN controller may analyze the message payload (i.e. unencrypted) of the second encrypted message to determine whether the HPLMN controller has acknowledged a validity of the VPLMN. In some examples, the message payload may include instructions relating to whether the user-plane traffic associated with the user device is to be routed via the VPLMN or the HPLMN.

At 612, the VPLMN controller may determine that the HPLMN controller did not acknowledge a validity of the VPLMN. In one example, the lack of an acknowledgement from the HPLMN controller may be implied in response to a failure of the VPLMN controller in receiving a second encrypted message from the HPLMN controller for a predetermined time interval. In any case, in response to a lack of acknowledgement of the validity of the VPLMN, the VPLMN controller may end process 600 and terminate, or cease to initiate, the communication session between the user device and the data network.

At 614, the VPLMN controller may determine that the HPLMN controller has acknowledged a validity of the VPLMN and that the user-plane traffic is to be routed via the VPLMN, based at least in part on the message payload of the second encrypted message. In doing so, the VPLMN controller may generate computer-executable instructions that cause the VPLMN to route user-plane traffic associated with the user device to the data network.

FIG. 7 illustrates process 700 that facilitates a HPLMN controller verifying an identity of a VPLMN, based at least in part on an exchange of network public keys or network certificates. In this example, process 700 is described from the perspective of the HPLMN controller, which receives a first encrypted message from the VPLMN controller.

At 702, the HPLMN controller may receive a first encrypted message from a VPLMN controller. The first encrypted message may include a request from a user device roaming within the VPLMN, to initiate a communication session via the VPLMN.

At 704, the HPLMN controller may initiate an exchange network public keys of asymmetric private-public key pairs, with the VPLMN controller. Alternatively, the HPLMN controller and the VPLMN controller may exchange network certificates, within which their network public keys are embedded. The public keys may be used by each respective VPLMN controller and HPLMN controller to decrypt encrypted messages sent by each counterpart telecommunication network (i.e. HPLMN or VPLMN).

At 706, the HPLMN controller may decrypt the first encrypted message using the public key of VPLMN controller that was received at step 704.

At 708, the HPLMN controller may analyze the message payload of the first encrypted message to determine whether the identity of the VPLMN is valid. In one example, by virtue of decrypting the first encrypted message using the public key of the VPLMN, the HPLMN controller may determine that the identity of the VPLMN is valid.

At 710, the HPLMN controller may determine that the identity of the VPLMN is not valid. This may occur in response to the HPLMN controller being unable to decrypt the first encrypted message using the public key provided by the VPLMN controller in step 704. In this instance, the HPLMN controller may elect to end process 700 and not respond to the VPLMN controller.

At 712, the HPLMN controller may determine that the identity of the VPLMN is valid. This may occur in response to the HPLMN controller being able to decrypt the first encrypted message sent by the VPLMN controller, using the public key of the VPLMN that was provided by the VPLMN controller in step 704.

In doing so, the HPLMN controller may generate a second encrypted message for delivery to the VPLMN controller. The second encrypted message may acknowledge a validity of the VPLMN and further include instructions relating to whether the user-plane traffic associated with the user device is to be routed via the HPLMN. In this example, the HPLMN controller may generate the second encrypted message by encrypting a second message payload using a private key that is a counterpart to the public key exchanged with the VPLMN controller in step 704. In some examples, the HPLMN controller may append a digital signature to the second encrypted message to permit the VPLMN controller to verify that the second message payload of the second encrypted message remains unchanged since being sent by the HPLMN controller.

FIG. 8 illustrates a process 800 for a network certificate aggregator (NCA) to facilitate the routing of user-plane traffic associated with a user device roaming in a VPLMN. In this example, process 800 is described from the perspective of the NCA. The NCA may act as a certificate authority (CA) that verifies the identities of interacting HPLMN and one or more VPLMNs. In other words, the NCA may act as a trusted entity that generates network certificates (i.e. digital certificates) associated with a HPLMN and one or more VPLMNs.

In the illustrated example, process 800 describes the NCA as acting as a conduit for data communications between a HPLMN and a VPLMN. More specifically, data communications between the VPLMN and the HPLMN are funneled through the NCA. Thus, the HPLMN and its counterpart VPLMN need only trust and verify an identity of the NCA.

At 802, the NCA may receive a public key of an asymmetric private-public key pair from each of a HPLMN controller and a VPLMN controller. In exchange, the NCA may transmit to each of the HPLMN controller and the VPLMN controller, a public key of an asymmetric private-public key pair associated with the NCA. The corresponding counterparts of each asymmetric private-public key pair, namely the private key of the HPLMN controller, the VPLMN controller, and the NCA, may be used to encrypt a message payload sent by each respective entity. Thus, by exchanging the public keys, each entity may decrypt an encrypted message sent by another, thereby enabling each entity to verify the origin of an encrypted message.

At 804, the NCA may receive, from a VPLMN controller, a first encrypted message associated with a request to initiate a communication session by a user device at the VPLMN. In this example, the user device may be roaming within the VPLMN.

At 806, the NCA may decrypt the first encrypted message using the public key of the VPLMN that was received as part of the exchange of network public keys of step 802. In doing so, the NCA may analyze the message payload (i.e. unencrypted) of the first encrypted message, thereby verifying an origin of the first encrypted message.

At 808, the NCA may generate a second encrypted message for delivery to the HPLMN controller of the HPLMN associated with the user device. The second encrypted message may include the request to initiate the communication session that was sent by the user device, as received from the VPLMN controller. In this example, the NCA may generate the second encrypted message using a private key of the NCA that is a counterpart to the public key exchanged with the HPLMN controller. In some examples, the NCA may generate and append a digital signature to the second encrypted message. The digital signature permits the HPLMN controller to verify that the message payload of the second encrypted message remains unchanged since being sent by the NCA.

At 810, the NCA may receive a third encrypted message from the HPLMN controller that acknowledges the request from the user device to initiate the communication session at the VPLMN. The NCA may decrypt the third encrypted message using the public key of the HPLMN controller received at step 802. In doing so, the NCA may analyze the message payload (i.e. unencrypted) of the third encrypted message.

At 812, the NCA may determine whether to route user-plane traffic via the HPLMN or the VPLMN. In some examples, a decision to route user-plane traffic via the HPLMN or the VPLMN may be based on a Service Level Agreement (SLA) between the HPLMN and the VPLMN and may be specified within the first encrypted message received by the VPLMN controller or the third encrypted message received from the HPLMN controller. The NCA may access a record, such as an SLA, from a data repository that specifies how to route user-plane traffic between a HPLMN and VPLMN.

At 814, the NCA may determine that the user-plane traffic is to be routed via the VPLMN. In doing so, the NCA may generate a fourth encrypted message for delivery to the VPLMN controller. The fourth encrypted message may acknowledge a validity of the HPLMN and further include instructions to route user-plane traffic via the VPLMN controller. The NCA may generate the fourth encrypted message using a private key of the NCA that is a counterpart to the public key exchanged with the VPLMN controller. In some examples, the NCA may further append a digital signature to the fifth encrypted message.

At 816, the NCA may determine that the user-plane traffic is to be routed via the HPLMN. In doing so, the NCA may generate a fifth encrypted message for delivery to the HPLMN controller. The fifth encrypted message may include instructions to route the user plane traffic via the HPLMN. The NCA may generate the fifth encrypted message using a private key of the NCA that is a counterpart to the public key exchanged with the HPLMN controller. In some examples, the NCA may further append a digital signature to the fifth encrypted message.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors;
receiving, at a Home Public Land Mobile Network (HPLMN) controller associated with a HPLMN, from a Visited Public Land Mobile Network (VPLMN) controller associated with a VPLMN, a first encrypted message that includes a request from a user device to initiate a communication session to route user-plane traffic associated with the user device to an additional data network, the first encrypted message includes a first message payload with instruction to route the user-plane traffic via the HPLMN;
determining, at the HPLMN controller, whether to route user-plane traffic associated with the user device to the additional data network via the VPLMN or the HPLMN based at least on the instructions included in the first encrypted message,
in response to a determination to route the user-plane traffic via the HPLMN, generating computer-executable instructions that cause the HPLMN controller to route the user-plane traffic via the HPLMN to the additional data network;
transmitting, from the HPLMN controller to the VPLMN controller, a second encrypted message, the second encrypted message including a second message payload that indicates whether to route additional user-plane traffic to the additional data network via the VPLMN or the HPLMN; and
determining, at the VPLMN controller, whether to route the additional user-plane traffic via the VPLMN or HPLMN based at least in part on the second message payload.

2. The computer-implemented method of claim 1, wherein the first encrypted message further includes a digital signature associated with the VPLMN controller, the digital signature having been generated by encrypting a cryptographic hash of the first message payload with a private key of a first asymmetric private-public key pair associated with the VPLMN controller.

3. The computer-implemented method of claim 1, wherein the first encrypted message comprises a network certificate associated with a network certificate aggregator (NCA), the NCA having received an initial encrypted message from the VPLMN controller.

4. The computer-implemented method of claim 1, further comprising:
receiving, from a Network Certificate Aggregator (NCA), a first public key of a first asymmetric private-public key pair associated with the NCA;
receiving, from the NCA, a network certificate associated with the VPLMN controller; and
verifying an origin of the network certificate by decrypting a digital signature of the network certificate using the first public key.

5. The computer-implemented method of claim 1, further comprising:
receiving, at the HPLMN controller, a public key of an asymmetric private-public key pair associated with the VPLMN controller; and
decrypting, at the HPLMN controller, the first encrypted message using the public key associated with the VPLMN controller.

6. The computer-implemented method of claim 1, further comprising:
determining that the additional user-plane traffic is to be routed via the VPLMN associated with the VPLMN controller based at least on the second message payload; and
generating the computer-executable instructions that route the additional user-plane traffic via the VPLMN.

7. The computer-implemented method of claim 1, wherein the second encrypted message further includes an additional digital signature associated with the HPLMN controller, the additional digital signature having been generated by encrypting a cryptographic hash of the second message payload with a private key of a second asymmetric private-public key pair associated with the HPLMN controller.

8. One or more non-transitory computer-readable media storing computer-executable instructions that, when executed on one or more processors, cause the one or more processors to perform acts comprising:
receiving, at a Home Public Land Mobile Network (HPLMN) controller associated with a HPLMN, from a Visited Public Land Mobile Network (VPLMN) controller associated with a VPLMN, a first encrypted message that includes a request from a user device to initiate a communication session to route user-plane traffic associated with the user device to an additional data network, the first encrypted message includes a first message payload with instruction to route the user-plane traffic via the HPLMN;

determining, at the HPLMN controller, whether to route user-plane traffic associated with the user device to the additional data network via the VPLMN or the HPLMN based at least on the instructions included in the first encrypted message;

in response to a determination to route the user-plane traffic via the HPLMN, generating computer-executable instructions that cause the HPLMN controller to route the user-plane traffic via the HPLMN to the additional data network;

transmitting, from the HPLMN controller to the VPLMN controller, a second encrypted message, the second encrypted message including a second message payload that indicates whether to route additional user-plane traffic to the additional data network via the VPLMN or the HPLMN; and determining, at the VPLMN controller, whether to route the additional user-plane traffic via the VPLMN or HPLMN based at least in part on the second message payload.

9. The one or more non-transitory computer-readable media of claim 8, wherein the first encrypted message further includes a digital signature associated with the VPLMN controller, the digital signature having been generated by encrypting a cryptographic hash of the first message payload with a private key of a first asymmetric private-public key pair associated with the VPLMN controller.

10. The one or more non-transitory computer-readable media of claim 8, wherein the first encrypted message comprises a network certificate associated with a network certificate aggregator (NCA), the NCA having received an initial encrypted message from the VPLMN controller.

11. The one or more non-transitory computer-readable media of claim 8, wherein the acts further comprise:
receiving, from a Network Certificate Aggregator (NCA), a first public key of a first asymmetric private-public key pair associated with the NCA;
receiving, from the NCA, a network certificate associated with the VPLMN controller; and
verifying an origin of the network certificate by decrypting a digital signature of the network certificate using the first public key.

12. The one or more non-transitory computer-readable media of claim 8, wherein the acts further comprise:
receiving, at the HPLMN controller, a public key of an asymmetric private-public key pair associated with the VPLMN controller; and
decrypting, at the HPLMN controller, the first encrypted message using the public key associated with the VPLMN controller.

13. The one or more non-transitory computer-readable media of claim 8, wherein the acts further comprise:
determining that the additional user-plane traffic is to be routed via the VPLMN associated with the VPLMN controller based at least on the second message payload; and
generating the computer-executable instructions that route the additional user-plane traffic via the VPLMN.

14. The one or more non-transitory computer-readable media of claim 8, wherein the second encrypted message further includes an additional digital signature associated with the HPLMN controller, the additional digital signature having been generated by encrypting a cryptographic hash of the second message payload with a private key of a second asymmetric private-public key pair associated with the HPLMN controller.

15. A system, comprising:
one or more processors; and
memory including a plurality of computer-executable components that are executable by the one or more processors to perform a plurality of actions, the plurality of actions comprising:
receiving, at a Home Public Land Mobile Network (HPLMN) controller associated with a HPLMN, from a Visited Public Land Mobile Network (VPLMN) controller associated with a VPLMN, a first encrypted message that includes a request from a user device to initiate a communication session to route user-plane traffic associated with the user device to an additional data network, the first encrypted message includes a first message payload with instruction to route the user-plane traffic via the HPLMN;

determining, at the HPLMN controller, whether to route user-plane traffic associated with the user device to the additional data network via the VPLMN or the HPLMN based at least on the instructions included in the first encrypted message;

in response to a determination to route the user-plane traffic via the HPLMN, generating computer-executable instructions that cause the HPLMN controller to route the user-plane traffic via the HPLMN to the additional data network;

transmitting, from the HPLMN controller to the VPLMN controller, a second encrypted message, the second encrypted message including a second message payload that indicates whether to route additional user-plane traffic to the additional data network via the VPLMN or the HPLMN; and determining, at the VPLMN controller, whether to route the additional user-plane traffic via the VPLMN or HPLMN based at least in part on the second message payload.

16. The system of claim 15, wherein the first encrypted message further includes a digital signature associated with the VPLMN controller, the digital signature having been generated by encrypting a cryptographic hash of the first message payload with a private key of a first asymmetric private-public key pair associated with the VPLMN controller.

17. The system of claim 15, wherein the actions further comprise:
receiving, from a Network Certificate Aggregator (NCA), a first public key of a first asymmetric private-public key pair associated with the NCA;
receiving, from the NCA, a network certificate associated with the VPLMN controller; and
verifying an origin of the network certificate by decrypting a digital signature of the network certificate using the first public key.

18. The system of claim 15, wherein the actions further comprise:
receiving, at the HPLMN controller, a public key of an asymmetric private-public key pair associated with the VPLMN controller; and
decrypting, at the HPLMN controller, the first encrypted message using the public key associated with the VPLMN controller.

19. The system of claim 15, wherein the actions further comprise:
   determining that the additional user-plane traffic is to be routed via the VPLMN associated with the VPLMN controller based at least on the second message payload; and
   generating the computer-executable instructions that route the additional user-plane traffic via the VPLMN.

20. The system of claim 15, wherein the second encrypted message further includes an additional digital signature associated with the HPLMN controller, the additional digital signature having been generated by encrypting a cryptographic hash of the second message payload with a private key of a second asymmetric private-public key pair associated with the HPLMN controller.

* * * * *